(12) United States Patent
Shiizaki et al.

(10) Patent No.: US 8,514,739 B2
(45) Date of Patent: Aug. 20, 2013

(54) WIRELESS COMMUNICATION DEVICE AND WIRELESS COMMUNICATION METHOD

(75) Inventors: Kotaro Shiizaki, Kawasaki (JP); Hiroyuki Seki, Kawasaki (JP); Kenji Suda, Kawasaki (JP); Daisuke Jitsukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/104,435

(22) Filed: May 10, 2011

(65) Prior Publication Data

US 2011/0281605 A1  Nov. 17, 2011

Related U.S. Application Data

(62) Division of application No. 11/487,352, filed on Jul. 17, 2006, now abandoned.

(30) Foreign Application Priority Data

Mar. 14, 2006  (JP) .................................. 2006-069037

(51) Int. Cl.
*H04L 12/26* (2006.01)
*H04B 7/216* (2006.01)
*H04J 3/24* (2006.01)

(52) U.S. Cl.
USPC ........................... 370/252; 370/335; 370/349

(58) Field of Classification Search
None
See application file for complete search history.

(56) References Cited

U.S. PATENT DOCUMENTS

| 5,729,557 | A | 3/1998 | Gardner et al. |
| 6,363,257 | B1 * | 3/2002 | Warwick ........................ 455/511 |
| 6,717,934 | B1 | 4/2004 | Kaasila et al. |
| 2001/0051520 | A1 * | 12/2001 | Johansson et al. ............. 455/423 |
| 2004/0179493 | A1 * | 9/2004 | Khan ............................. 370/332 |
| 2005/0037771 | A1 * | 2/2005 | Tiedemann et al. ........... 455/453 |
| 2005/0265373 | A1 * | 12/2005 | Khan ............................. 370/437 |
| 2006/0008020 | A1 | 1/2006 | Blankenship et al. |
| 2006/0209970 | A1 * | 9/2006 | Kanterakis ..................... 375/259 |
| 2007/0070956 | A1 * | 3/2007 | Seki ............................... 370/335 |
| 2009/0125777 | A1 | 5/2009 | Hiraki et al. |

FOREIGN PATENT DOCUMENTS

| JP | 09-065411 | 3/1997 |
| JP | 09-139980 | 5/1997 |
| JP | 11-261644 | 9/1999 |
| JP | 2000-201373 | 7/2000 |
| JP | 2003-259439 | 9/2003 |

(Continued)

OTHER PUBLICATIONS

United States Patent Office Non-Final Office Action issued for corresponding U.S. Appl. No. 11/487,352, dated Oct. 30, 2009.

(Continued)

*Primary Examiner* — Steven H Nguyen
(74) *Attorney, Agent, or Firm* — Myers Wolin, LLC

(57) ABSTRACT

The present invention relates to a wireless communication device performing communications by using a radio frame containing a control channel and a data channel, the wireless communication device comprises of a structuring unit that allocates a first part of the control channel adjacent to the data channel in the radio frame, and allocates a second part of the control channel, which denotes different control information from the first part, to the data channel so as to be inserted between data of the data channel and a transmission unit that transmits the radio frame including the data channel and the control channel.

3 Claims, 15 Drawing Sheets

(56) References Cited

FOREIGN PATENT DOCUMENTS

| JP | 2005-033426 | 2/2005 |
|----|-------------|--------|
| JP | 2005-348336 | 12/2005 |
| JP | 2006-303894 | 11/2006 |
| WO | 2004/062205 | 7/2004 |
| WO | 2005/120116 | 12/2005 |

OTHER PUBLICATIONS

United States Patent Office Final Office Action issued for corresponding U.S. Appl. No. 11/487,352, dated Apr. 27, 2010.
United States Patent Office Non-Final Office Action issued for corresponding U.S. Appl. No. 11/487,352, dated Oct. 26, 2010.
United States Patent Office Final Office Action issued for corresponding U.S. Appl. No. 11/487,352, dated Feb. 17, 2011.
Lower rate extension of channel coding to the rate >1/3; 3GPP TSG RAN WG1 meeting #42bis; R1-051082 dated Oct. 10-Oct. 14, 2005; San Diego, USA; pp. 1-9.
Extended European Search Report, dated Aug. 3, 2007, issued for corresponding European Patent Application No. 06253606.5-2415 Reference No. P106597EP00/DNL, pp. 1-10.
Japanese Patent Office "Notice of Reason for Rejection" issued for corresponding Japanese Patent Application No. 2006-069037, mailed Aug. 10, 2010. English translation attached.
Notice of Reason for Rejection issued for corresponding Japanese Patent Application No. 2010-228659 mailed May 29, 2012 with English translation.
Notice of Reason for Rejection issued for corresponding Japanese Application No. 2010-228659, mailed Sep. 4, 2012, with English translation.
The extended European search report includes the European search opinion issued for corresponding European Patent Application No. 12169492.1, dated Oct. 12, 2012.
Notice of Reason for Rejection issued for corresponding Japanese Patent Application No. 2010-228659, mailed Mar. 19, 2013 with full English translation.
Motorola, "E-UTRA Downlink Control Channel Design and TP", Agenda Item: 8.2, Nov. 7-11, 2005, R1-051331, 3GPP TSG RAN1 #43, Seoul, Korea.
Motorola, "E-UTRA Downlink Control Channel Design and Performance and TP", Agenda Item: 5.1.2.3, Jan. 23-25, 2006, R1-060009, 3GPP TSG RAN1 LTE Ad Hoc, Helsinki, Finland.
Motorola, "E-UTRA Downlink Control Channel Structure and TP", Agenda Item: 13.1.3, Feb. 13-17, 2006, R1-060378, 3GPP TSG RAN1 #44, Denver, US.
NTT DoCoMo et al., "L1/L2 Control Channel Structure for E-UTRA Uplink", Agenda Item: 13.2.2.3, Feb. 13-17, 2006, R1-060320, 3GPP TSG-RAN WG1 Meeting #44, Denver, US.

* cited by examiner

FIG. 6

| SINR (dB) | MCS | MODULATION METHOD | CODING RATE |
|---|---|---|---|
| ~0 | 1 | QPSK | 1/3 |
| 0~5 | 2 | QPSK | 3/4 |
| 5~10 | 3 | 16QAM | 1/2 |
| 10~15 | 4 | 16QAM | 3/4 |
| 15~ | 5 | 16QAM | 8/9 |

WIRELESS COMMUNICATION DEVICE AND WIRELESS COMMUNICATION METHOD

CROSS REFERENCE TO RELATED APPLICATION

The present application is a divisional of U.S. application Ser. No. 11/487,352, filed on Jul. 17, 2006, now pending, which claims the benefit of Japanese Patent Application No. JP2006-069037, filed on Mar. 14, 2006, the contents of each are herein wholly incorporated by reference.

BACKGROUND OF THE INVENTION

1. Field of the Invention

The present invention relates to a wireless communication device and a wireless communication method that perform communications by use of a wireless frame containing a control channel and a data channel.

2. Description of the Related Art

In a cellular mobile communication system, cells as communication areas covered by respective base stations are located so as to be neighboring to each other or partially overlapped with each other. Each base station connects each mobile station to the mobile communication system by performing wireless communications with a plurality of mobile stations located within each corresponding cell. In this type of cellular mobile communication system, an important subject is to improve a throughput in the mobile station located at the cell edge. Generally, an error rate characteristic deteriorates in the cell edge, because the received power from the base station covering the cell is attenuated, and the mobile station is susceptible to interference by the signals from the base stations located in other cells in the periphery.

A method of solving such a problem is a method of giving, as for transmission signals to the mobile station at the cell edge, more of redundancy of the data than the transmission signals to other mobile stations. This is the method of transmitting the data repeatedly inserting the information having the same content with respect to the transmission signals to the mobile station at the cell edge. This method, however, causes the transmission frame to be upsized and leads to an increase of an overhead of the transmission frame. Further, even when fixing a transmission frame length, it follows that a substantial data transmission quantity decreases.

Another method is that the transmission data to the mobile station at the cell edge is subjected to error correction coding that exhibits the higher redundancy than the transmission data to other mobile stations. Proposed in regard to this method is a scheme (refer to Non-Patent document 1) that turbo encoding having a one-third ($1/3$) coding rate is used for the transmission data to the mobile station in the vicinity of the base station, and the low-rate turbo encoding having the coding rates such as $1/5$ and $1/9$ that are equal to or lower than $1/3$ is used for the transmission data to the mobile station at the cell edge (refer to "3rd Generation Partnership Project, "Lower rate extension of channel coding to the rate<$1/3$", 3GPP TSG RAN WG1 meeting #42bis (R1-051082), 2005-10, Agenda Item 8.7."). With this scheme, even in the communications to the mobile station located at the cell edge in a transmission environment of very poor quality, it is expected to prevent the deterioration in the error rate characteristic and the decrease in the throughput by using the low-rate turbo encoding with the increased redundancy.

In the conventional arts described above, however, though capable of improving the decrease in the throughput with respect to a data channel for transmitting to the mobile station located at the cell edge, a problem about the transmission of a control channel still remains. This problem will hereinafter be explained with reference to FIGS. 14, 15 and 16. FIG. 14 is a diagram showing a frame format used for the conventional cellular mobile communication system. FIG. 15 is a diagram showing a coding switchover method corresponding to a cell location in the prior art. FIG. 16 is a diagram showing a transmitting/receiving state in the prior art.

The frame format as shown in FIG. 14 is used for the communications between the base station and the mobile station. The wireless frame is assembled by a pilot channel (PICH), a control channel (CCH) and a data channel (DCH). The coding switchover method proposed in the conventional art described above is a technique targeting on the data channel in the wireless frame. Generally, as for the control channel, convolutional coding having the coding rate "$1/3$" is used in common with the respective mobile stations.

FIG. 15 shows an example of such a case that a base station 500 covering a cell 510 performs the communications with a mobile station 501 located in the vicinity of the base station 500 and with a mobile station 502 located at the cell edge. In the conventional art, 16 QAM (Quadrature Amplitude Modulation) modulation method and the turbo encoding having the coding rate "$1/3$" are used for the data channel in the signals to the mobile station 501 located in the vicinity of the base station 500, and QPSK (Quadrature Phase Shift Keying) modulation method and the convolutional coding having the coding rate "$1/3$" are used for the control channel. Such a design is made that the transmission of the control channel totally exhibits a more preferable error rate characteristic than by the transmission of the data channel in the vicinity of the base station 500.

On the other hand, the communications with the mobile terminal 502 located at the cell edge involve such a change that the QPSK modulation method and the low-rate turbo encoding with its coding rate equal to or lower than the coding rate "$1/3$" are used for the data channel, and involve using, for the control channel, the QPSK modulation method and the convolutional coding having the coding rate "$1/3$" as they are. Namely, in the mobile station located at the cell edge, the data channel uses the coding having the larger redundancy than the control channel has, and therefore such a phenomenon might occur that the error rate characteristic of the control channel becomes lower than the error rate characteristic of the data channel at the cell edge.

In the conventional arts, the control channel contains control information for correctly demodulating and decoding user data allocated to the data channel, and hence, as shown in FIG. 16, if the mobile station 502 detects that an error occurs in the control channel, the mobile station 502 prompts the base station 500 to execute retransmission. Accordingly, in the conventional arts, it follows that the retransmission is repeated if the error frequently occurs in the control channel and that a decrease in transmission efficiency of the whole system is brought about.

For solving these problems, it is considered that the redundancy of the coding used for the control channel is set larger than the coding redundancy for the data channel. In this method, however, the control channel generally uses a format common to all the mobile stations, and therefore, when increasing the redundancy for the control channel and upsizing the control channel, it follows that the whole transmission frame gets excessively upsized. Further, even when fixing the transmission frame length, it follows that the substantial transmission quantity decreases due to the increase in the overhead of the control channel. Hence, this type of method results in increasing the overhead of the transmission frame.

SUMMARY OF THE INVENTION

It is an object of the present invention to provide a wireless communication device and a wireless communication method that improve a throughput without increasing the overhead of the wireless frame.

The present invention adopts the following configurations in order to solve the problems described above. Namely, according to the present invention, a wireless communication device performing communications by using a wireless frame containing a control channel and a data channel, comprises a structuring unit allocating, as second control information, part of control information used for communication control to the data channel with respect to a transmitted wireless frame to be transmitted to one other wireless communication device.

Given herein as the control information used for the communication control are, for example, information on a modulation method, a coding rate etc about the wireless frame to be transmitted, and information such as CQI (Channel Quality Information), a modulation method and a coding rate that should be utilized for the wireless frame to be transmitted to the present wireless communication device from the other wireless communication device as a transmission destination. In the present invention, there is transmitted the wireless frame in which part of these control information is allocated as the second control information to the data channel.

Hence, according to the present invention, in the wireless communication device receiving the transmitted wireless frame, even if an error occurs in the received control channel, without making a retransmission request, the control information, which might have been utilized if the error would not occur, is estimated, and the user data can be demodulated and decoded by using this estimated control information.

With this scheme, according to the present invention, without increasing an overhead of the wireless frame, even in the case of performing the communications with the mobile station in a channel status of which quality is as poor as in the vicinity of a cell edge, it is possible to reduce the retransmission due to occurrence of the error in only the control channel and to improve the throughput.

Further, the wireless communication device according to the present invention may further comprise a rate determination unit determining, based on information of a channel status with a wireless communication device as a transmission destination, redundancy of the data channel with respect to the transmitted wireless frame, wherein the structuring unit, when the determined redundancy of the data channel becomes higher than redundancy of the control channel, may allocate the second control information to the data channel.

In the present invention, the redundancy of the data channel of the transmitted wireless frame is changed based on the information of the channel status with the wireless communication device as the transmission destination. Then, as a result of being changed, if the redundancy of the data channel gets higher than the redundancy of the control channel, the second control information is allocated to the data channel.

Accordingly, in the present invention, for instance, if poor of the channel status with the other wireless communication device as the communication partner device and if increasing the redundancy of the data channel, the second control information is allocated to the data channel and is, whereas if not, allocated to the control channel as conventional.

With this scheme, the proper wireless frame can be used corresponding to the channel status while improving the throughput by reducing the retransmission, and the extra overhead of the wireless frame can be reduced.

Moreover, in the wireless communication device according to the present invention, the structuring unit may dually allocate the second control information to the control channel and to the data channel.

Further, in the wireless communication device according to the present invention, the structuring unit may allocate, as first control information, in the control information, the information used for the demodulation process and for the decoding process in the wireless communication device receiving the transmitted wireless frame to the control channel, and may set other information as the second control information.

In the present invention, in the wireless communication device receiving the transmitted wireless frame, the easy-to-estimate information is allocated to the control channel, and other hard-to-estimate information are allocated to the data channel.

Hence, according to the present invention, in the wireless communication device on the receiving side, if the error occurs in only the control channel, the data allocated to the data channel can be demodulated and decoded by using the control information to be estimated, and therefore the occurrence of the retransmission can be further reduced.

Still further, in the wireless communication device according to the present invention, the structuring unit, with respect to the transmitted wireless frame, may set, as the second control information, the control information related to the received wireless frame in the control information.

Herein, in the control information, the control information for the wireless frame received from the other wireless communication device is, for example, the CQI and is exemplified such as a modulation method indicated to the other wireless communication device by the present wireless communication device. These information are the hard-to-estimate information in the wireless communication device receiving the wireless frame, and are allocated to the data channel.

With this scheme, according to the present invention, even if the error occurs in the control channel, the other wireless communication device can generate the transmitted wireless frame by using the second control information allocated to the data channel, and it is therefore possible to reduce the occurrence of the retransmission.

Yet further, according to the present invention, a wireless communication device performing communications by using a wireless frame containing a control channel and a data channel, comprises an error detection unit detecting an error in data allocated to the received control channel, an estimating unit estimating the control information that should be allocated to the received control channel, and a demodulating/decoding unit demodulating and decoding, if an error is detected by the error detection unit, the data allocated to the received data channel by using the control information estimated by the estimating unit.

The wireless communication device according to the present invention specifies a configuration of the wireless communication device on the side of receiving the wireless frame transmitted by the wireless communication device described above. Namely, if the error occurs in the data allocated to the control channel, since this data allocated to the control channel can not be used, the data allocated to the received data channel is demodulated and decoded based on the control information estimated by the estimating unit.

Moreover, the wireless communication device according to the present invention may further comprise a generation unit extracting the control information contained in the data demodulated and decoded by the demodulating/decoding unit, and generating respective pieces of data allocated to the control channel and the data allocated to the data channel by use of the extracted control information with respect to the transmitted wireless frame that should be transmitted.

According to the present invention, even if the error occurs in the control channel, the transmitted wireless frame can be generated by using the control information in the data channel, and hence the occurrence of the retransmission can be reduced.

It should be noted the present invention may also be a program for actualizing any one of the functions described above. Further, the present invention may also be a readable-by-computer storage medium stored with this program.

According to the present invention, it is possible to actualize the wireless communication device and the wireless communication method that improve the throughput without increasing the overhead of the wireless frame.

BRIEF DESCRIPTION OF THE DRAWINGS

FIG. 6 is a diagram showing an example of an MCS table;

DESCRIPTION OF THE PREFERRED EMBODIMENTS

Outline of Embodiments of the Invention

Figure 1:
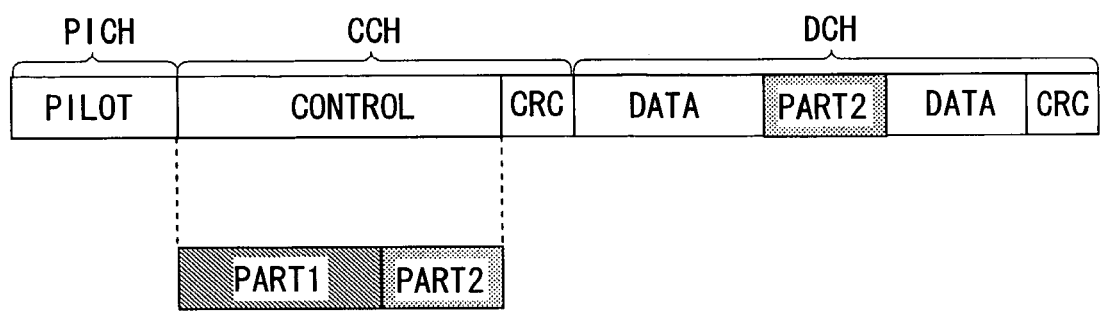
FIG. 1 is a diagram showing an example 1 of a frame format in the embodiment.
Figure 2:
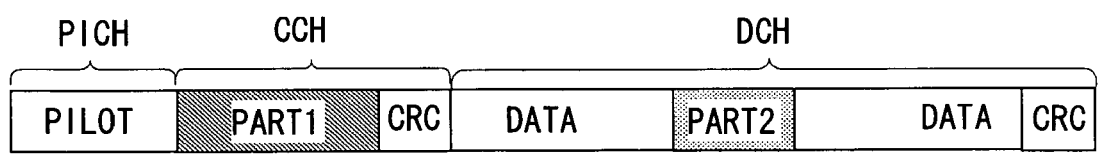
FIG. 2 is a diagram showing an example 2 of the frame format in the embodiment.
Figure 14:
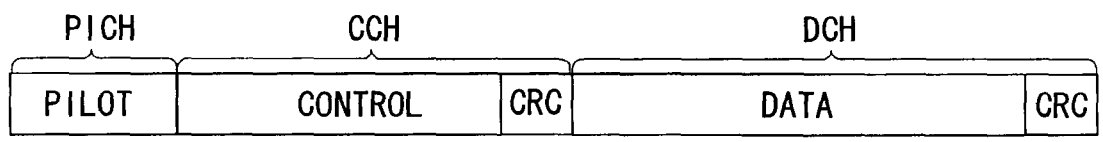
FIG. 14 is a diagram showing a conventional frame format.

For discussing embodiments of the present invention, at first, an outline of the embodiments of the present invention will be explained with reference to FIGS. 1 and 2. FIGS. 1 and 2 are diagrams showing an example of a transmission frame format used in the embodiments of the present invention. In the embodiments, control information allocated to a control channel in the frame format shown in FIG. 14 is segmented into two parts (a control information part 1 and a control information part 2), wherein the control information part 2 thereof is allocated to a data channel.

As a method of segmenting the control information, there is considered a method by which the control information part 2 contains such a piece of information as to be changed each time performing the transmission and unable to be easily estimated in a receiving-side device, while the control information part 1 contains other pieces of information that can be easily estimated in the receiving-side device. Specifically, for instance, the information about a modulation method, a coding rate, etc is contained in the control information part 1, and the information such as CQI (Channel Quality Information) representing a channel status is contained in the control information part 2. This is because the information about the modulation method supported by a system to some extent, which is fixed as in the case of QPSK (Quadrature Phase Shift Keying) and 16 QAM (Quadrature Amplitude Modulation), is data that falls within a fixed range even when changed and is therefore considered to be the data easy to be estimated in the receiving-side device, while the information such as the CQI is data that momentarily changes and is unfixed in width of this change and is therefore considered not to be the data that can be easily estimated in the receiving-side device.

Considered is an example where the thus-segmented control information part 1 and control information part 2 are allocated as shown in FIGS. 1 and 2. FIG. 1 shows an example in which the control information part 2 is allocated dually to the control channel and to the data channel. FIG. 2 shows an example in which the control channel contains only the control information part 1, and the control information part 2 is allocated to the data channel. In the example shown in FIG. 2, a length of the control channel is shorter than a length of the conventional control channel illustrated in FIG. 14.

Figure 3:
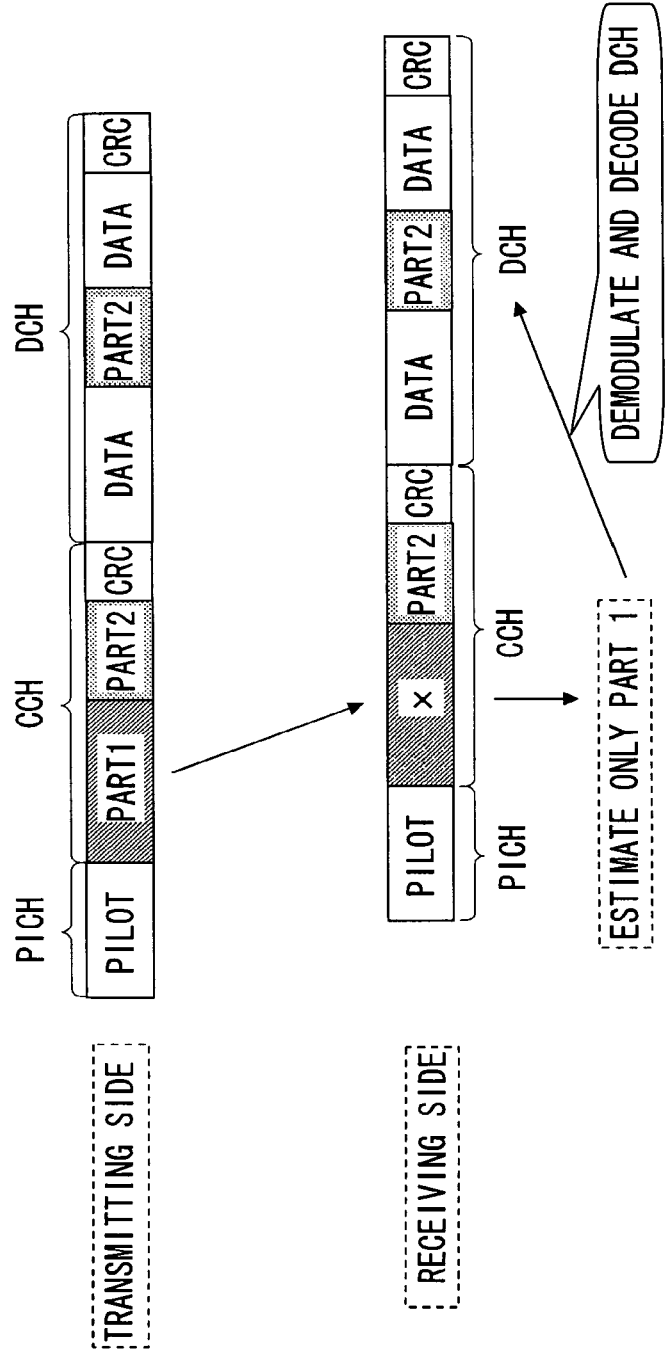
FIG. 3 is a diagram showing a transmitting/receiving state in the embodiment.
Figure 16:
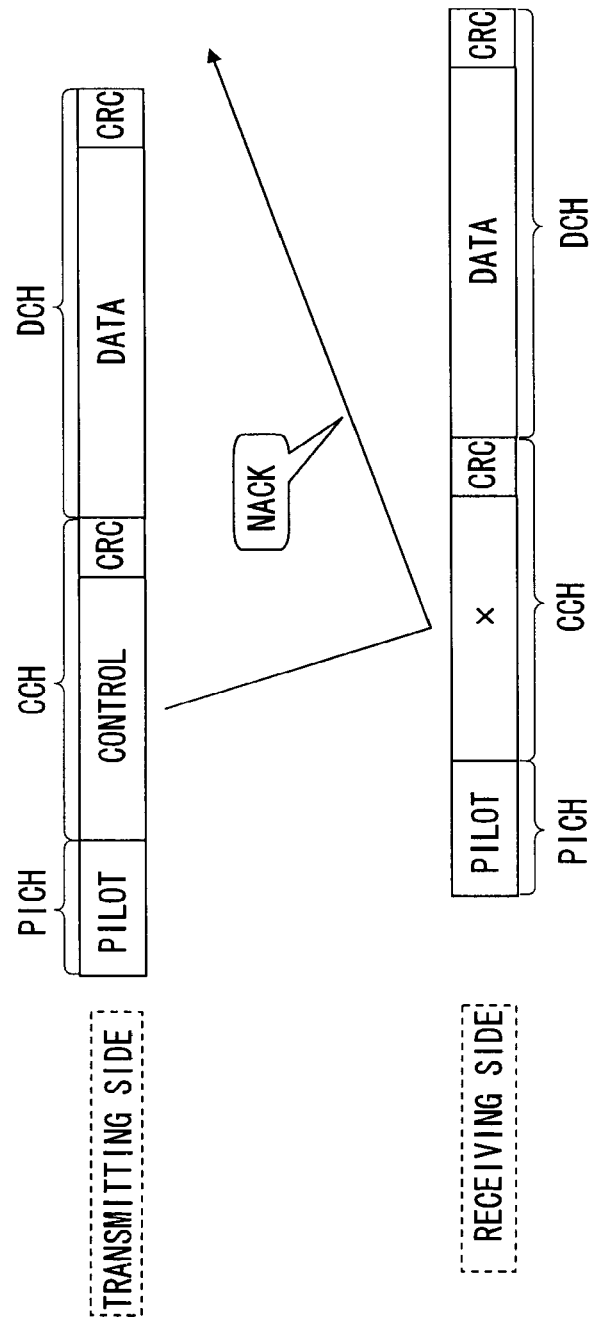
FIG. 16 is a diagram showing a transmitting/receiving state in the prior art.

FIG. 3 is a diagram showing a transmitting/receiving state in the embodiment using the frame format as described above. In the transmitting/receiving state in the case of the conventional art shown in FIG. 16, if an error occurs in the control information, the receiving-side device requests a transmitting-side device to retransmit without decoding user data; and, in the transmitting/receiving state in the embodiment shown in FIG. 3, even if the error occurs in the control information, a possibility that the user data is correctly demodulated and decoded is improved by estimating the control information part 1.

In a case where a mobile station is located in the vicinity of a base station and so on, however, in such an environment that the control channel has a more preferable error rate characteristic than the data channel has, there is no merit in allocating a part of the control channel to the data channel, and hence the conventional message format shown in FIG. 14 should be employed. In the embodiment, the frame format is changed over corresponding to respective coding rates used in the data channel and in the control channel. To be specific, if the coding rate of the data channel exhibits higher redundancy than the coding rate of the control channel, the control information part 2 is allocated to the data channel, and, whereas if the coding rate of the data channel exhibits the lower redundancy than the coding rate of the control channel, the conventional frame format is used. In the following discussion, a scheme of allocating the control information part 2 to the data channel is referred to also as [conducting the in-band].

First Embodiment

A wireless communication system in a first embodiment of the present invention will hereinafter be described with reference to the drawings. Configurations in the following embodiments are exemplifications, and the present invention is not limited to the configurations in the embodiments.

System Architecture

Figure 15:
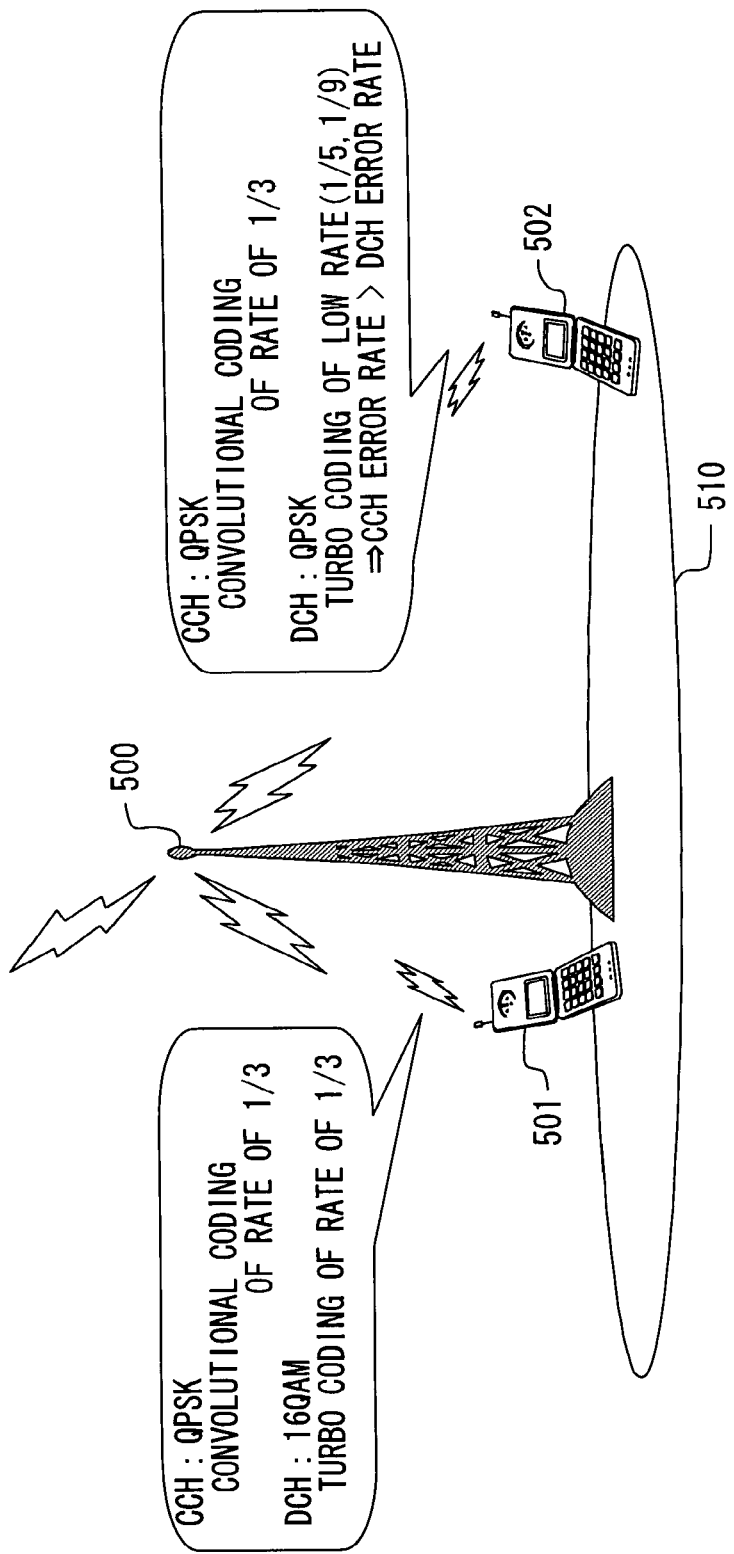
FIG. 15 is a diagram showing a coding switchover method in accordance with a conventional cell location.

The wireless communication system in the first embodiment shall be, as shown in FIG. 15, configured by a base station device (which will hereinafter simply be termed a base station) 500, and a mobile station devices (which will hereinafter be simply termed mobile stations) 501 and 502. The configuration illustrated in FIG. 15 is nothing more than one example adopted for the sake of explanatory convenience, wherein a plurality of base stations and a plurality of mobile stations may exist, and an unillustrated control device etc may further be provided. Hereinafter, as shown in FIG. 15, the explanation will be made along with such a case example that the base station 500 covering a cell 510 performs communications respectively with the mobile station 501 located in the vicinity of the base station 500 and with the mobile station 502 located at the cell edge.

Frame Format

Figure 4:
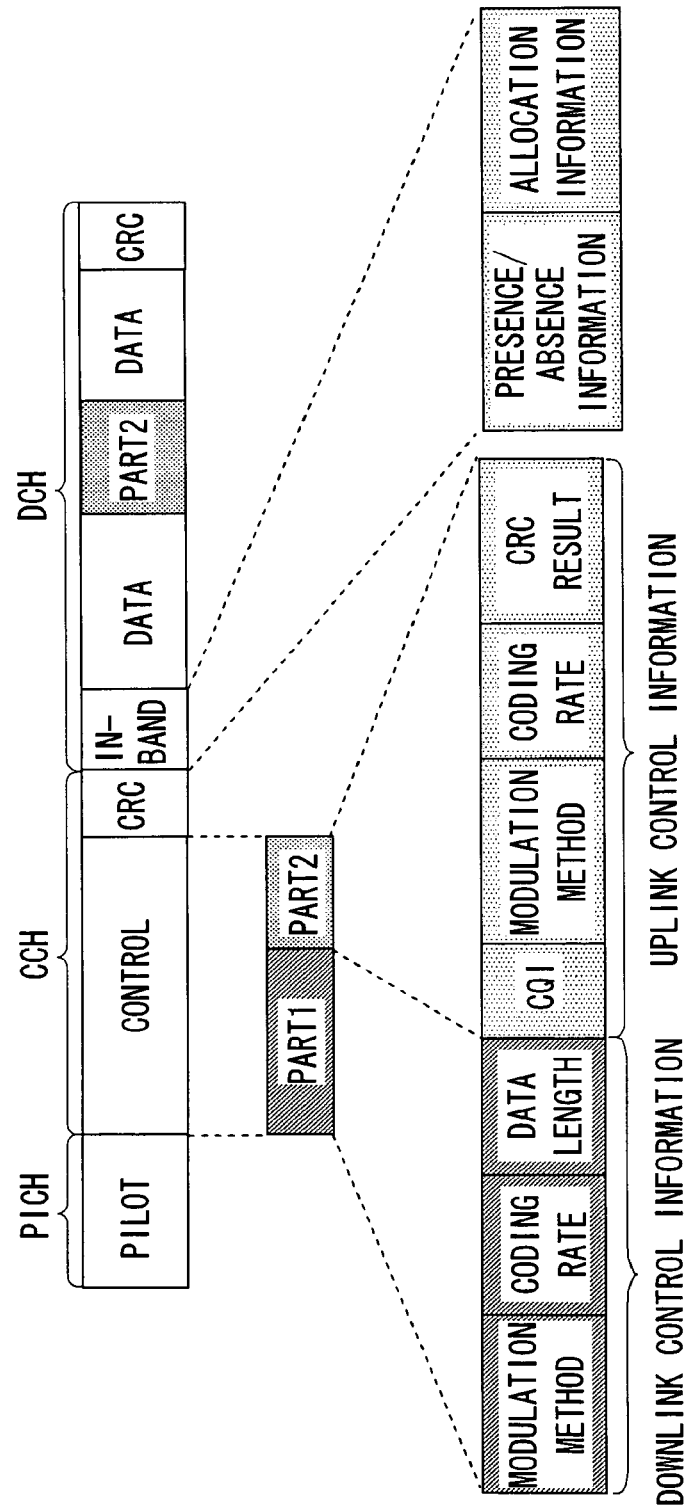
FIG. 4 is a diagram showing a frame format in a first embodiment.

The frame format used in the wireless communication system in the first embodiment will be explained with reference to FIG. 4. FIG. 4 is a diagram showing the frame format in the first embodiment, and shows the format of a frame (a frame of a downlink) to be transmitted from the base station 500 to the mobile station 501 or 502. The frame format in the first embodiment corresponds to the example shown in FIG. 1, which has been described in the item of the Outline of Embodiment of the Invention, and has a structure wherein the control information part 2 is dually allocated to the control channel (CCH) and to the data channel (DCH).

In the first embodiment, the control information is segmented in a way that sets downlink control information as the control information part 1 (PART 1) and uplink control information as the control information part 2 (PART 2). The downlink control information contains a modulation method, a coding rate, a data length, etc that are related to the data transmitted in the form of the frame. On the other hand, the uplink control information contains the CQI estimated by the base station, the modulation method and the coding rate that are indicated to the mobile station by the base station and a result of a cyclic redundancy check (which will hereinafter be abbreviated to CRC) of a transmission message to the base station from the mobile station.

The uplink control information segmented as the control information part 2 is, it follows, allocated to the data channel. In-band information (IN-BAND) is further allocated to the data channel. A reason why this in-band information is allocated to the data channel lies in keeping a control channel size unchanged. The data channel size can be judged from the data length contained in the downlink control information, and therefore no problem arises even when the in-band information is thus allocated thereto.

The in-band information contains presence/absence information showing whether the control information part 2 is allocated to the data channel or not (presence or absence of the in-band) and allocation information showing a location where the control information part 2 in the data channel is allocated. A piece of identifying information expressed by, e.g., a numerical value may be set in the presence/absence information field, wherein such a scheme may be taken that when [0] is set, this represents no existence of the control information part 2, and, when [1] is set, this represents existence of the control information part 2. An offset address from, e.g., the head of the data channel may also be set in the allocation information field.

It should be noted the data contained in the control information part 1 and the control information part 2 are not limited to the data described above, and the data structure thereof changes corresponding to the system. For instance, a spreading ratio, a code multiplexing count, etc can be contained as the downlink control information in a CDMA (Code Division Multiple Access) system, an antenna count etc can be contained as the downlink control information in a MIMO (Multi Input Multi Output) system, and a guard interval length etc can be contained as the downlink control information in an OFDM (Orthogonal Frequency Division Multiplexing) system. Further, in the case of a system where the transmitting-side device computes reception timing of a signal from each of the receiver devices and indicates transmission timing of the receiving-side device corresponding thereto, information such as a timing adjustment notifying bit for actualizing this scheme can be contained as the uplink control information.

Base Station

Figure 5:
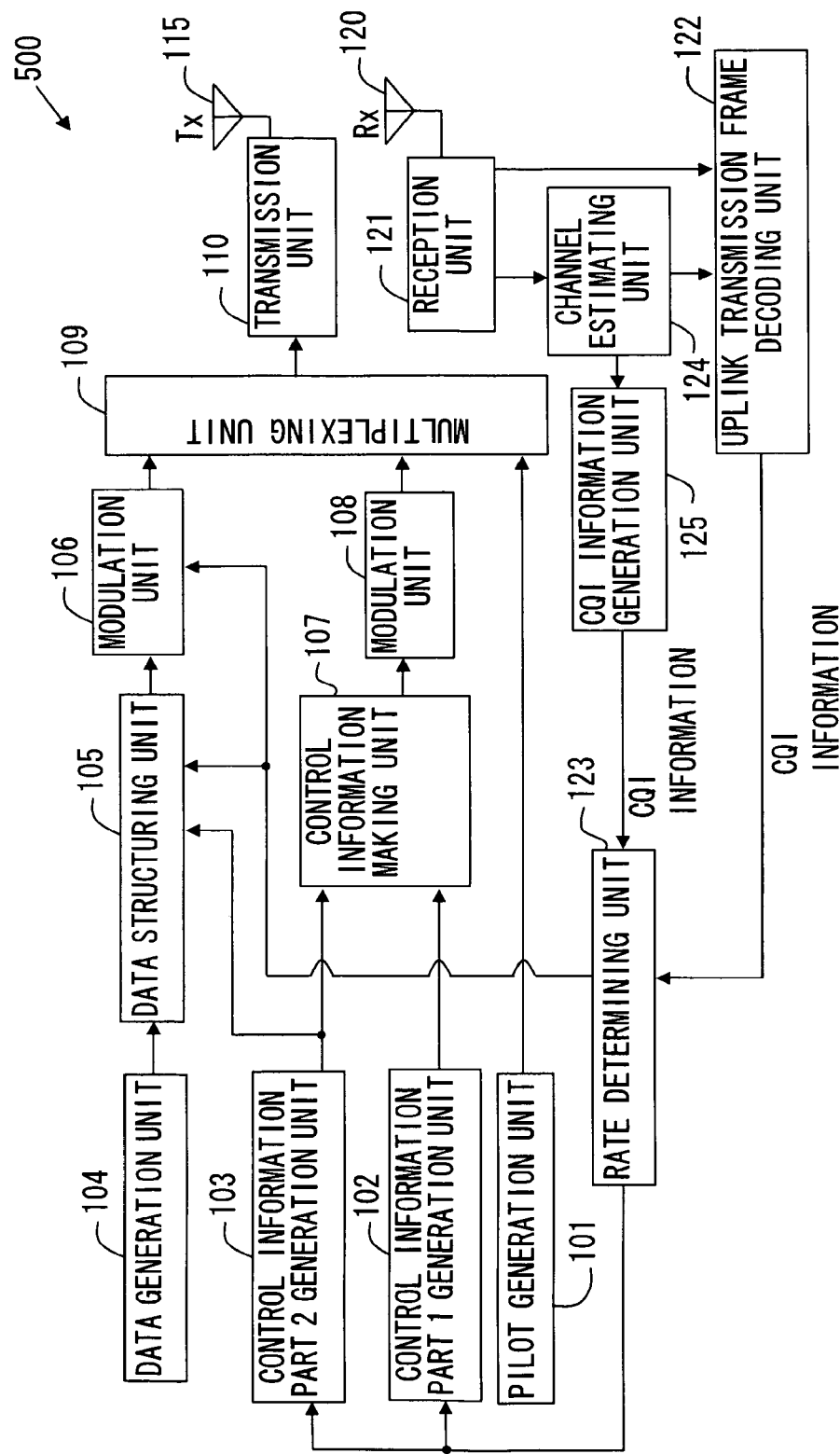
FIG. 5 is a diagram showing a device configuration of a base station in the first embodiment.

A device configuration of the base station 500 in the first embodiment will hereinafter be described with reference to FIG. 5. FIG. 5 is a block diagram showing the device configuration related to transmitting functions of the base station 500 in the first embodiment. The base station 500 in the first embodiment includes, as the transmitting functions, a pilot generation unit 101, a control information part 1 generation unit 102, a control information part 2 generation unit 103, a data generation unit 104, a data structuring unit 105, a modulation unit 106, a control information making unit 107, a modulation unit 108, a multiplexing unit 109, a transmission unit 110, a transmitting antenna 115, a receiving antenna 115, a reception unit 121, an uplink transmission frame decoding unit 122, a rate determining unit 123, a channel estimating unit 124 and a CQI information generation unit 125. Among these components, the receiving antenna 120, the reception unit 121 and the uplink transmission frame decoding unit 122 are, though taking a charge of the receiving functions, taken up herein as the functional units that acquire the information to be utilized in the functional units taking the transmitting functions.

The reception unit 121, upon receiving the signals transmitted from the mobile station and received by the receiving antenna 120, executes processes such as a frequency conversion, an analog/digital conversion and demodulation upon the received signals. The reception unit 121 sends the signals, which have undergone these predetermined processes, to the uplink transmission frame decoding unit 122. Further, the reception unit 121 sends a pilot signal in the receiving signals to the channel estimating unit 124.

The channel estimating unit 124 compares the pilot signal transferred from the reception unit 121 with an already-known pilot signal, thereby obtaining a channel estimation value related to the uplink to the base station from the mobile station as a sender. This channel estimation value may also be obtained from, e.g., calculation by the least-squares method. The present invention does not limit this channel estimating method. This channel estimation value is transferred to the uplink transmission frame decoding unit 122 and the CQI information generation unit 125.

The uplink transmission frame decoding unit 122 demodulates and decodes the signals received from the reception unit 121 by use of the channel estimation value received from the channel estimating unit 124, and acquires the CQI transmitted from the mobile station as a signal sender of these signals from the decoded signals. The thus-acquired CQI is transferred to the rate determining unit 123.

The CQI information generation unit 125 generates the CQI related to the uplink based on the channel estimation value etc transferred from the channel estimating unit 124. This CQI may also be generated and acquired by dividing, for example, with respect to SINR (Signal to Interference and Noise Ratio), desired power of each symbol ("S") by interference noise power ("I"). The desired power of each symbol is obtained by squaring, e.g., an absolute value of the channel estimation value, and the interference noise power is obtained by taking, e.g., a correlation between the receiving signal and the pilot signal. It is to be noted that the present invention does not limit these CQI calculation methods. The uplink-related CQI generated by the CQI information generation unit 125 is transferred to the rate determining unit 123.

The rate determining unit 123 receives the CQI transferred from the uplink transmission frame decoding unit 122, i.e., the downlink-related CQI generated in the mobile station and the CQI transferred from the CQI information generation unit 125, i.e., the uplink-related CQI generated in the base station, and determines the predetermined coding rate and modulation method on the basis of these CQIs. The rate determining unit 123 determines the coding rate and the modulation method of the data channel to be transmitted on the basis of the SINR contained in, e.g., the downlink-related CQI, and determines the coding rate and the modulation method to be contained in the uplink control information on the basis of the SINR contained in the uplink-related CQI.

The rate determining unit 123 previously retains an MCS (Modulation Coding Scheme) table as shown in FIG. 6, and determines the coding rate and the modulation method of the data channel by referring to this MCS table. FIG. 6 shows an example of the MCS table, wherein the SINR is associated with the MCS. This is the table example in a case where the CQI transmitted from each of the mobile stations is the SINR. An identification number related to combination of the modulation method and the coding rate is set in an MCS field.

The rate determining unit 123, when the SINR is transmitted as the CQI from the uplink transmission frame decoding unit 122, refers to the MCS table and thus determines the MCS associated with this SINR. For example, if the SINR is 3.5 decibels (dB), the rate determining unit 123 selects MCS=2. This selection leads to such determination that the modulation method of the data channel is QPSK and the coding rate is ¾. The thus determined modulation method and coding rate of the data channel are sent to the data structuring unit 105 and to the control information part 1 generation unit 102.

The rate determining unit 123 similarly determines, based on the uplink-related CQI transferred from the CQI information generation unit 125, the modulation method and the coding rate that should be indicated to the mobile station by referring to the MCS table. The determined modulation method and coding rate are transferred, together with the CQI transferred from the CQI information generation unit 125, to the control information part 2 generation unit 103. It should be noted that the first embodiment has exemplified the example of determining the modulation method etc on the basis of the SINR contained in the CQI, however, the determination thereof may also be made using CQIs other than this CQI.

The pilot generation unit 101, the control information part 1 generation unit 102, the control information part 2 generation unit 103 and the data generation unit 104 are provided corresponding to the frame format used in the first embodiment, and generate pieces of data in charge of these respective units. To be specific, the control information part 1 generation unit 102 generates the downlink control information on the basis of the downlink-related modulation method and decoding method transferred from the rate determining unit 123. The control information part 2 generation unit 103 generates the uplink control information on the basis of the uplink-related modulation method and decoding method transferred from the rate determining unit 123 and also the uplink-related CQI transferred from the CQI information generation unit 125. Herein, the CQI contained in the uplink control information generated by the control information part 2 generation unit 103 contains the uplink-related CQI generated by the CQI information generation unit 125. Note that the CQI contained in the uplink control information may also contain the CQI generated by the mobile station and extracted by the uplink transmission frame decoding unit 122.

The pilot data generated by the pilot generation unit 101 is transferred to the multiplexing unit 109, the control information part 1 (the downlink control information) generated by the control information part 1 generation unit 102 is transferred to the control information making unit 107, the control information part 2 (the uplink control information) generated by the control information part 2 generation unit 103 is transferred respectively to the control information making unit 107 and to the data structuring unit 105, and the user data generated by the data generation unit 104 is transferred to the data structuring unit 105.

The control information making unit 107 assembles the control information part 1 and the control information part 2 together and thus generates control information data to be allocated to the control channel in the frame format shown in FIG. 4. The control information making unit 107 encodes this control information data at a predetermined coding rate. The coding rate and the coding method implemented by the control information making unit 107 involve using a coding rate and a coding method that are fixed in the system, wherein, for instance, a convolutional coding method using a coding rate "⅓" is employed. The encoded control information data undergoes the predetermined modulation process by the modulation unit 108 and is transferred to the multiplexing unit 109. The modulation method implemented by the modulation unit 108 involves using a method fixed in the system, wherein, for example, the QPSK is employed. Note that the coding rate, the coding method and the modulation method related to the control channel involve the use of the methods fixed in the system and may also be adjustably retained in a table etc. Moreover, the present invention does not limit the coding rate, the coding method and the modulation method related to the control channel.

The data structuring unit 105 generates the data to be allocated to the data channel in the frame format shown in FIG. 4. Hereat, the data structuring unit 105 compares the coding rate of the data channel that is received from the rate determining unit 123 with the coding rate of the control channel that is fixed in the system, thereby determining whether or not the control information part 2 received from the control information part 2 generation unit 103 is allocated to the data channel. Specifically, the data structuring unit 105, if the coding rate of the data channel is lower than the coding rate of the control channel, allocates the control information part 2 to a predetermined location in the data channel, and, in cases other than this, does not allocate the control information part 2 to the data channel.

The data structuring unit 105, in the case of allocating the control information part 2 to the data channel, attaches the in-band information, which [presence] set in the presence/absence information field and the allocation of the control information part 2 set in the allocation information field, to the head of the data to be allocated to the data channel. The data structuring unit 105, if the control information part 2 is not allocated to the data channel, attaches the in-band information which [absence] set in the presence/absence information field and the initial value set in the allocation information field. The thus-generated data is coded at the coding rate transferred from the rate determining unit 123 and is transferred to the modulation unit 106. The coding method implemented by the data structuring unit 105 involves using the method fixed in the system, wherein normally a turbo encoding method is employed. The coded data is modulated by the modulation unit 106 in a way that uses the modulation method determined by the rate determining unit 123, and is transferred to the multiplexing unit 109.

The multiplexing unit 109 multiplexes the pilot signal, the control information signal and the data signal, which have been each modulated, and transfers these multiplexed signals to the transmission unit 110. The multiplexed signals transferred to the transmission unit 110 are subjected to the processes such as the digital/analog conversion and the frequency conversion, and are transmitted from the transmitting antenna 115.

Mobile Station

Figure 7:
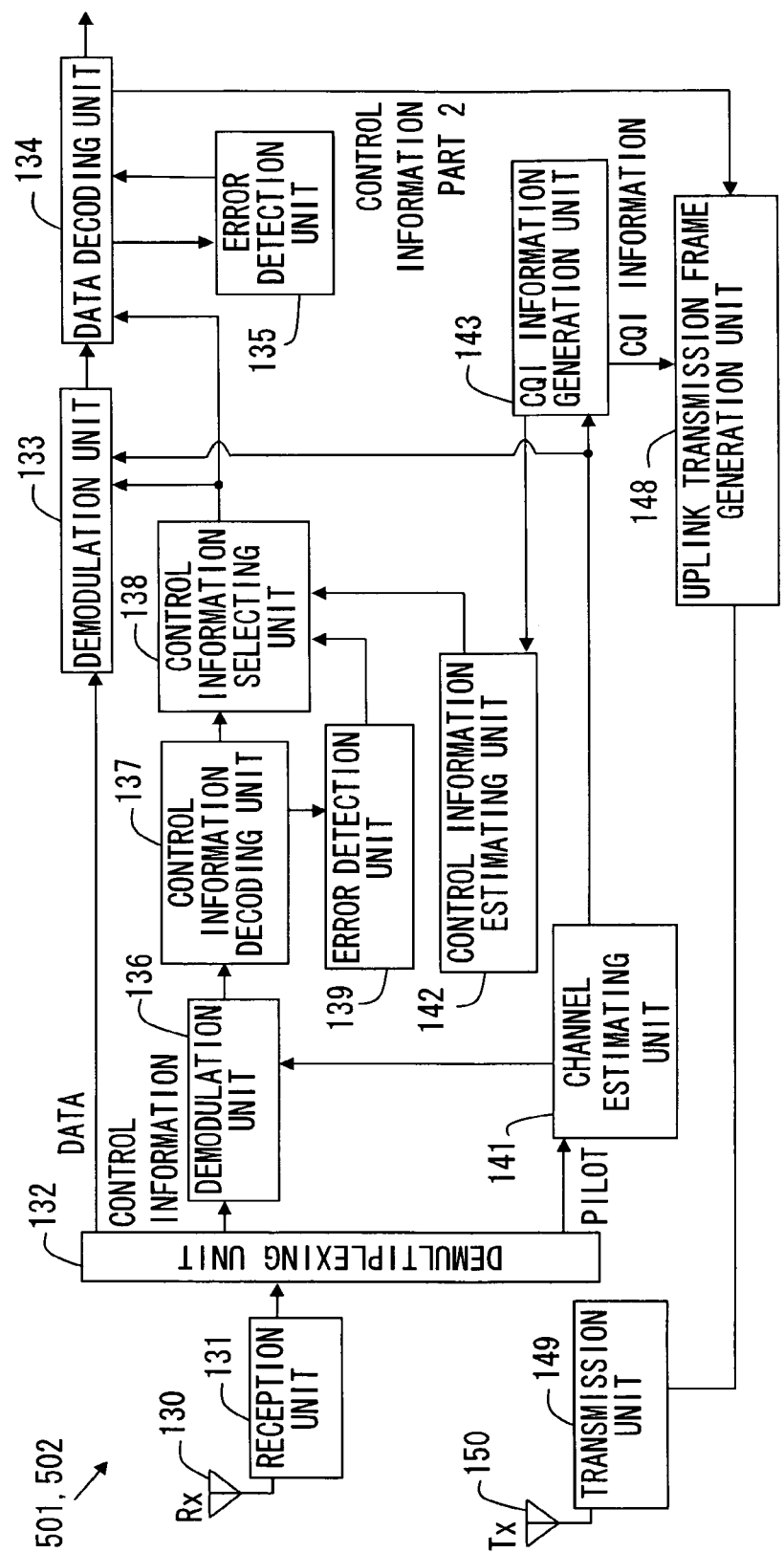
FIG. 7 is a diagram showing a device configuration of a mobile station in the first embodiment.

A device configuration of each of the mobile stations 501 and 502 in the first embodiment will hereinafter be described with reference to FIG. 7. FIG. 7 is a block diagram showing the device configuration related to receiving functions of the mobile stations 501 and 502 in the first embodiment. Note that the mobile stations 501 and 502 are each the same device, and hence the following discussion shall deal with the mobile station 501. The mobile station 501 in the first embodiment includes, as the receiving functions, a receiving antenna 130, a demultiplexing unit 132, a demodulation unit 133, a data decoding unit 134, an error detection unit 135, a demodulation unit 136, a control information selecting unit 138, an error detection unit 139, a channel estimating unit 141, a control information estimating unit 142, a CQI information generation unit 143, an uplink transmission frame generation unit 148, a transmission unit 149 and a transmitting antenna 150. Among these components, the transmitting antenna 150, the transmission unit 149 and the uplink transmission frame generation unit 148 are, though taking a charge of the transmitting functions, taken up herein as the functional units for notifying the base station 500 of the CQI.

The receiving unit 131, upon receiving the signals transmitted from the base station 500 and received by the receiving antenna 130, executes the processes such as the frequency conversion and the analog/digital conversion upon these received signals. The signals undergoing these predetermined processes are demultiplexed by the demultiplexing unit 132 into the pilot signal, the control information signal and the data signal. The pilot signal is transferred to the channel estimating unit 141, the control information signal is transferred to the demodulation unit 136, and the data signal is transferred to the demodulation unit 133.

The channel estimating unit 141 compares the pilot signal transferred from the demultiplexing unit 132 with the already-known pilot signal, thereby obtaining a channel estimation value related to the downlink to the mobile station 501 from the base station 500. The present invention does not restrict this channel estimating method, and therefore the channel estimation value may also be obtained from, e.g., the calculation by the least-squares method. This channel estimation value is transferred to the demodulation units 133 and 136 and the CQI information generation unit 143.

The CQI information generation unit 143 generates the CQI on the basis of the channel estimation value etc transferred from the channel estimating unit 141. The generation method by the CQI information generation unit 143 is the same as by the CQI information generation unit 125 in the base station device, and hence its explanation is herein omitted.

The demodulation unit 136 demodulates the control information signal transferred from the demultiplexing unit 132 on the basis of the channel estimation value transferred from the channel estimating unit 141. Further, the demodulation unit 136 demodulates the control information signal by the demodulation method corresponding to the modulation method (QPSK) implemented by the base station 500 with respect to the control information signal. This demodulation method involves utilizing the method fixed in the system as the base station 500 retains the corresponding modulation method by way of the fixed-in-system method. The demodulated control information signal is transferred to the control information decoding unit 137.

The control information decoding unit 137 decodes the control information signal transferred from the demodulation unit 136 by the decoding method corresponding to the coding rate ($1/3$) and the coding method (the convolutional coding method) implemented by the base station 500 with respect to the control information signal. This decoding method involves utilizing the method fixed in the system as the base station 500 retains the corresponding coding rate and coding method by way of the fixed-in-system method. The decoded control information data is sent to the error detection unit 139 and to the control information selecting unit 138.

The error detection unit 139 detects an error by checking the CRC allocated to the control channel. The error detection unit 139 sends a detection result to the control information selecting unit 138.

The control information selecting unit 138 selects the control information used for the demodulation of the data channel in accordance with the detection result sent from the error detection unit 139. The control information selecting unit 138, if the detection result shows no error (normal), acquires the control information part 1 and the control information part 2 in the control information data sent from the control information decoding unit 137. The modulation method in the control information part 1 is transferred to the demodulation unit 133, and the coding rate in the control information part 1 is transferred to the data decoding unit 134. The control information part 2 is transferred as it is to the data decoding unit 134. Whereas if the detection results shows occurrence of the error, the control information selecting unit 138 sends the control information part 1 estimated by the control information estimating unit 142 respectively to the demodulation unit 133 and to the data decoding unit 134, and notifies the data decoding unit 134 of the occurrence of the error.

The control information estimating unit 142 estimates the control information part 1 on the basis of the SINR contained in the CQI given from the CQI information generation unit 143. The control information part 1 is, as described above, the information generated in the base station 500 on the basis of the SINR that is fed back from the mobile station 501, and can therefore be generated in the mobile station 501 as well. Namely, the control information estimating unit 142 previously retains the MCS table as shown in FIG. 6 and determines the coding rate and the modulation method by referring to this MCS table. The control information part 1 is obtained by employing the thus-determined coding rate and modulation method. The thus-estimated control information part 1 is sent to the control information selecting unit 138.

the demodulation unit 133 demodulates the data signal transferred from the demultiplexing unit 132 on the basis of the channel estimation value transferred from the channel estimating unit 141. The demodulation unit 133 further demodulates this demodulated data signal by the demodulation method corresponding to the modulation method received from the control information selecting unit 138. The demodulated data is sent to the data decoding unit 134.

The data decoding unit 134 decodes the demodulated data on the basis of the coding rate and the coding method received from the control information selecting unit 138. The decoded data is transferred to the error detection unit 135. Moreover, the data decoding unit 134 extracts the in-band information allocated to the head of the decoded data. The data decoding unit 134, if the [presence] is set in the presence/absence information field of this in-band information, extracts the control information part 2 from the decoded data on the basis of the location (address) information set in the same location information field. The data decoding unit 134, based on the error detection result of which the error detection unit 135 has notified, if this detection result shows no error (normal), outputs the decoded user data to other functional units (unillustrated), and sends the control information part 2 to the uplink transmission frame generation unit 148.

Note that as for this control information part 2, if the information showing [absence] is set in the presence/absence information field of the in-band information, the control information part 2 received from the control information selecting unit 138 may be sent to the uplink transmission frame generation unit 148, and, if the information showing [presence] is set in the presence/absence information field of the in-band information, the control information part 2 extracted by the data decoding unit 134 may also be sent.

The error detection unit 135 detects the error by checking the CRC with respect to the decoded data. This error detection result is fed back to the data decoding unit 134.

The uplink transmission frame generation unit 148 sets, as the control information, the control information part 2 received from the data decoding unit 134 and the CQI information received from the CQI information generation unit 143, and generates a transmission frame from this control information and from the user data received from other functional units (unillustrated). At this time, the uplink transmission frame generation unit 148 encodes the control information at the predetermined coding rate (⅓) and by the predetermined coding method (convolutional coding), and modulates the coded control information by the fixed-in-system modulation method (QPSK). Further, the user data undergoes the predetermined coding at the coding rate contained in the control information part 2 received from the data decoding unit 134, and is modulated by the modulation method contained in the same control information part 2. The thus-generated uplink transmission frame is subjected to the processes such as the digital/analog conversion and the frequency conversion and is transmitted from the transmitting antenna 150.

Operational Example

Operations of the base station 500 and the mobile stations 501 and 502 in the first embodiment will hereinafter be explained. To start with, the transmitting operation of the base station 500 in the first embodiment will be explained with reference to FIG. 5.

The base station 500, when transmitting the data to the mobile station 501, transmits the data without conducting the in-band of the control information part 2. This is because the data structuring unit 105 determines not to allocate the control information part 2 to the data channel, since the coding rate of the data channel regarding the transmitted wireless frame that is determined by the rate determining unit 123 does not get lower than the coding rate of the control channel that is fixed in the system.

On the other hand, the base station 500, on the occasion of transmitting the data to the mobile station 502, transmits the data conducted the in-band of the control information part 2. In this case, a CQI value of which the mobile station 502 notifies is very poor quality, and the coding rate of the data channel, which is determined by the rate determining unit 123, becomes lower than the fixed-in-system coding rate of the control channel. This being the case, the data structuring unit 105 allocates the control information part 2 to the data channel.

Figure 8:
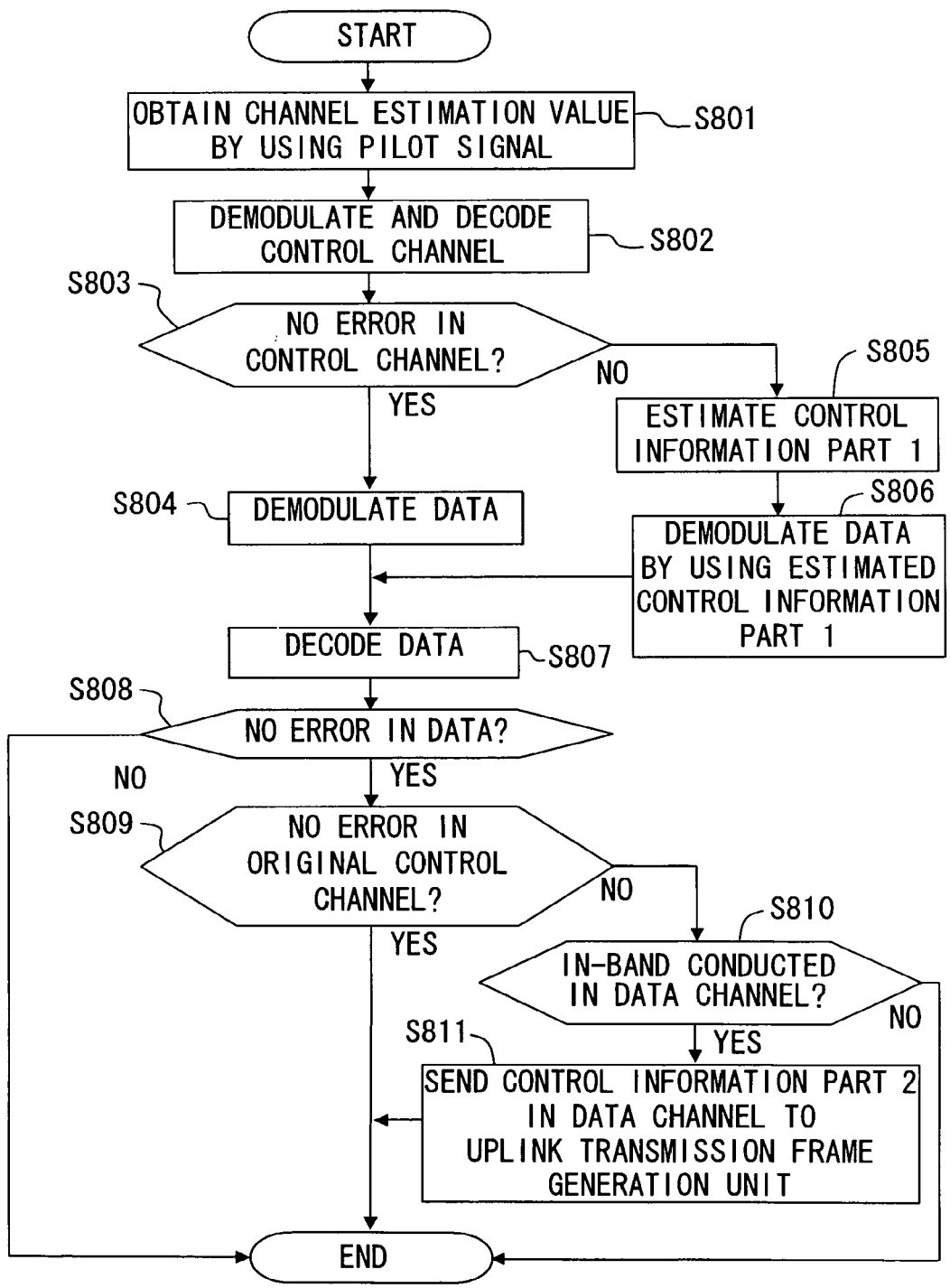
FIG. 8 is a diagram showing a receiving operation of the mobile station in the first embodiment.

Next, a receiving operation of each of the mobile stations 501 and 502 in the first embodiment will be explained with reference to FIG. 8. FIG. 8 is a flowchart showing an example of the receiving operation of each of the mobile stations 501 and 502 in the first embodiment.

The demultiplexing unit 132, upon receiving the received signals from the reception unit 131, demultiplexes these received signals into the pilot signal, the control information signal and the data signal. The channel estimating unit 141 estimates the channel between the base station and the mobile station from the thus-demultiplexed pilot signal (S801). The thus-estimated channel estimation value is sent to the demodulation unit 136 related to the control information signal, and the control information signal is demodulated based on the channel estimation value by the demodulation unit 136. Further, the demodulation unit 136 demodulates the control information signal by the demodulation method corresponding to the modulation method (QPSK) implemented by the base station 500 (S802). Still further, the control information decoding unit 137 decodes the thus-demodulated control information data by the decoding method corresponding to the coding rate (⅓) and the coding method (convolutional coding) implemented by the base station 500 (S802).

The decoded control information data is sent to the error detection unit 139, wherein the CRC is checked by the error detection unit 139. As a result, if judged to have no error (S803; YES), the control information selecting unit 138 transfers the control information part 1 contained in the control information data to the demodulation unit 133 and to the data decoding unit 134. The demodulation unit 133 demodulates the data signal sent from the demultiplexing unit 132 on the basis of the channel estimation value given from the channel estimating unit 141, and further demodulates the data signal by the demodulation method corresponding to the modulation method contained in the control information part 1 received from the control information selecting unit 138 (S804). Note that at this time, the control information selecting unit 138, when the control information part 2 is allocated to the control channel, extracts and transfers this control information part 2 to the data decoding unit 134.

While on the other hand, if the error detection unit 139 judges that there is an error (S803; NO), the control information estimating unit 142 estimates the modulation method and the coding rate from the CQI (SINR) given from the CQI information generation unit 143 (S805). An estimation method by this control information estimating unit 142 is the same as the determination method of determining the modulation method and the coding rate by the rate determining unit 123 of the base station 500. This estimated modulation method is sent to the demodulation unit 133, while the estimated coding rate is sent to the data decoding unit 134. With this operation, if the error occurs in the control channel, the demodulation unit 133 demodulates the data by the modulation method estimated by the control information estimating unit 142 (S806).

The data decoding unit 134, if the error occurs in the control channel, executes predetermined decoding corresponding to the coding rate estimated by the control information estimating unit 142, and, if the error does not occur in the control channel, executes predetermined decoding corresponding to the coding rate set in the control information part 1 of the control channel (S807). The decoded CRC is checked by the error detection unit 135, thereby checking whether or not the error occurs in the data allocated to the data channel. Then, if judged to have the error in the data (S808; NO), a retransmission request is made.

The data decoding unit 134, if judged to have no error from the information, showing whether or not the error occurs in the control channel, of which the control information selecting unit 138 has notified (S809; YES), sends the control information part 2 in the control channel to the uplink transmission frame generation unit 148. Whereas if judged to have the error (S809; NO) and if the in-band is conducted (S810; YES), the data decoding unit 134 sends the control information part 2 allocated (in-band) into the data channel to the uplink transmission frame generation unit 148 (S811). Note that if the error occurs in the control channel (S809; NO) and if the in-band is not conducted (S810; NO), the retransmission request is made.

Operation and Effect in Embodiment

The wireless communication system in the first embodiment involves employing the frame format, wherein the control information, which should be originally transmitted by the control channel, is segmented into the control information part 1 consisting of the downlink control information and into the control information part 2 consisting of the uplink control information, and the control information part 2 is dually allocated to the control channel and to the data channel.

In the base station 500, the data structuring unit 105 compares the data channel coding rate determined by the rate determining unit 123 with the fixed-in-system coding rate of the control channel, and thus determines whether or not the control information part 2 is allocated (in-band) into the data channel. The rate determining unit 123 determines the coding rate etc of the data channel, corresponding to the channel status (CQI) with the mobile station as the transmission destination. Then, in the case of transmitting to the mobile station that is located in the vicinity of the base station 500 and in a good channel status as the mobile station 501 is, the wireless frame format without conducting the in-band of the control information part 2 is used. On the other hand, in the case of transmitting to the mobile station that is located at the cell edge and in a channel status of very poor quality as the mobile station 502 is, the wireless frame format with conducting the in-band of the control information part 2 is used.

Thus, in the first embodiment, the determination is made corresponding to the channel status with the mobile station as the transmission destination so as not to conduct the in-band in the case of the preferable channel status (the case where the coding rate of the data channel does not become lower than the coding rate of the control channel) and so as to conduct the in-band in the case of the poor channel status (the case where the coding rate of the data channel gets lower than the coding rate of the control channel).

The use of this type of frame format, according to the first embodiment, eliminates the necessity of increasing the size of the control channel and does not cause an extreme rise in the overhead of the transmission frame.

In the mobile station, the control information signal in the control channel is demodulated and decoded by the fixed-in-system demodulation method, coding rate and decoding method. The demodulated and decoded control information data is checked the CRC by the error detection unit 139, thereby checking whether or not the error exists in the control information data. Herein, if judged to have the error, the control information data can not be used, and hence the control information estimating unit 142 estimates the modulation method and the coding rate on the basis of the CQI generated by the CQI information generation unit 143. Hereafter, the data in the data channel is, if no error exists in the control channel, demodulated and decoded based on the control information in the control channel, and is, if the error exists in the control channel, demodulated and decoded by the modulation method, the coding rate and the decoding method that are estimated by the control information estimating unit 142.

Thus, in the first embodiment, even when the error occurs in the data in the control channel, the control information, which should be allocated to the control channel concerned, is estimated by the same method as the generation method of the base station 500 as a generator of the control information, and the data channel is demodulated and decoded by use of the thus-estimated control information.

Accordingly, if the error occurs in the control channel, there was no alternative but to prompt the retransmission to be done, however, according to the first embodiment, the data channel can be demodulated and decoded based on the equal control information, thereby eliminating the necessity of prompting the retransmission to be done. With this effect, even when the error frequently occurs in the control channel in the communications with the mobile station located at the cell edge, it is possible to avoid a phenomenon of causing a decrease in transmission efficiency of the system as a whole by repeating the retransmission.

Further, in the mobile station, if the error occurs in the control channel and when the control information part 2 is allocated (in-band) into the data channel, the uplink transmission frame is generated based on the control information part 2 in the data channel.

Thus, in the first embodiment, even if originally unable to acquire the uplink control information contained in the control information due to the occurrence of the error in the control channel, the uplink transmission control information is allocated (in-band) into the data channel, and therefore the frame for the uplink transmission is generated by use of the uplink transmission control information conducted the in-band.

Accordingly, this configuration also enables a retransmission request frequency to be decreased and, more essentially, a throughput of the whole system to be improved.

Second Embodiment

The wireless communication system according to a second embodiment of the present invention will hereinafter be described. The wireless communication system according to the first embodiment discussed above uses the frame format corresponding to the example shown in FIG. 1 as discussed in the item of Outline of Embodiments of the Invention, i.e., the frame format having the structure in which the control information part 2 is dually allocated to the control channel (CCH) and to the data channel (DCH). The wireless communication system in the second embodiment uses the frame format corresponding to the example illustrated in FIG. 2 discussed in the item of Outline of Embodiments of the Invention. The description shall be focused on different functional units from those in the first embodiment with respect to the base station 500 and the mobile stations 501, 502 that configure the wireless communication system in the second embodiment. A configuration in the second embodiment in the following discussion is an exemplification, and the present invention is not limited to the following configuration. Note that the system architecture is the same as in the case of the first embodiment, and hence its explanation is omitted.

Frame Format

Figure 9:
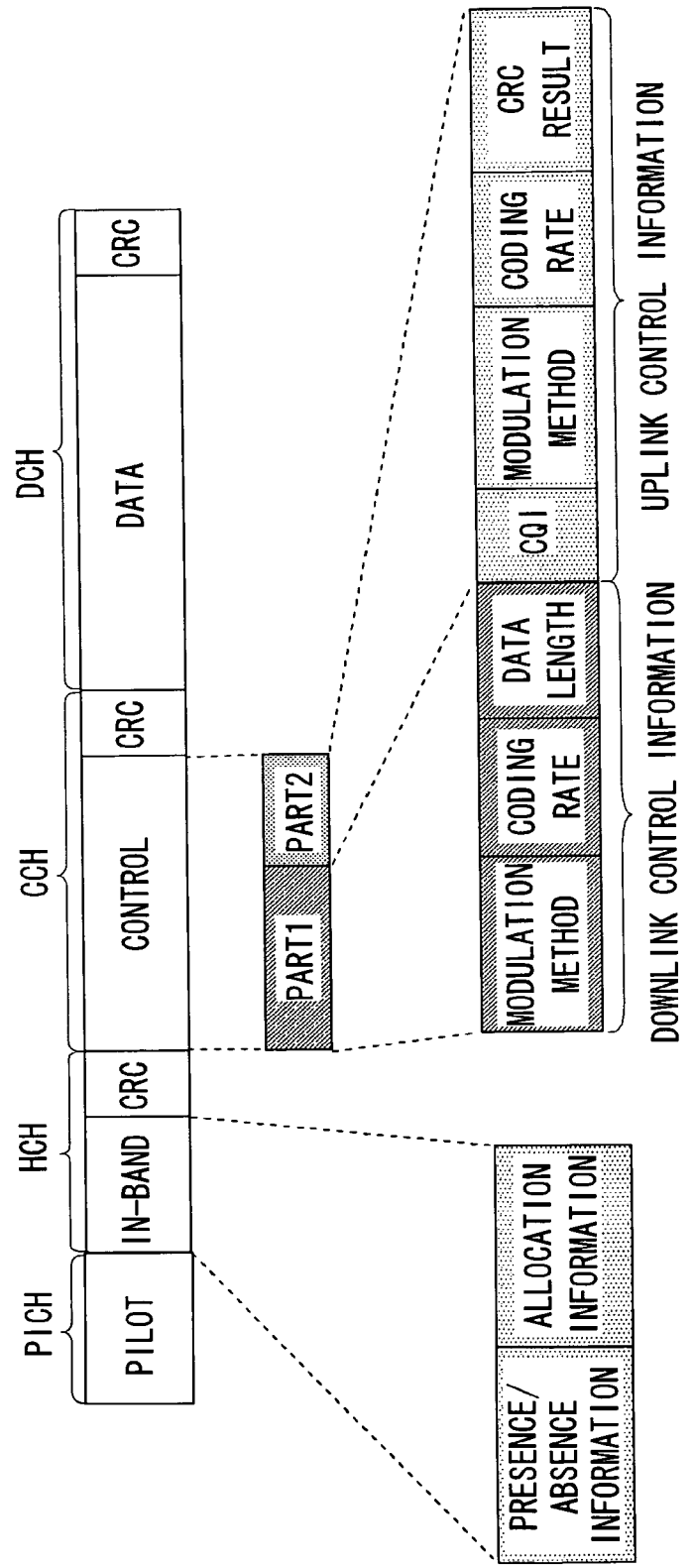
FIG. 9 is a diagram showing a frame format (a case of not conducting in-band) in a second embodiment.
Figure 10:
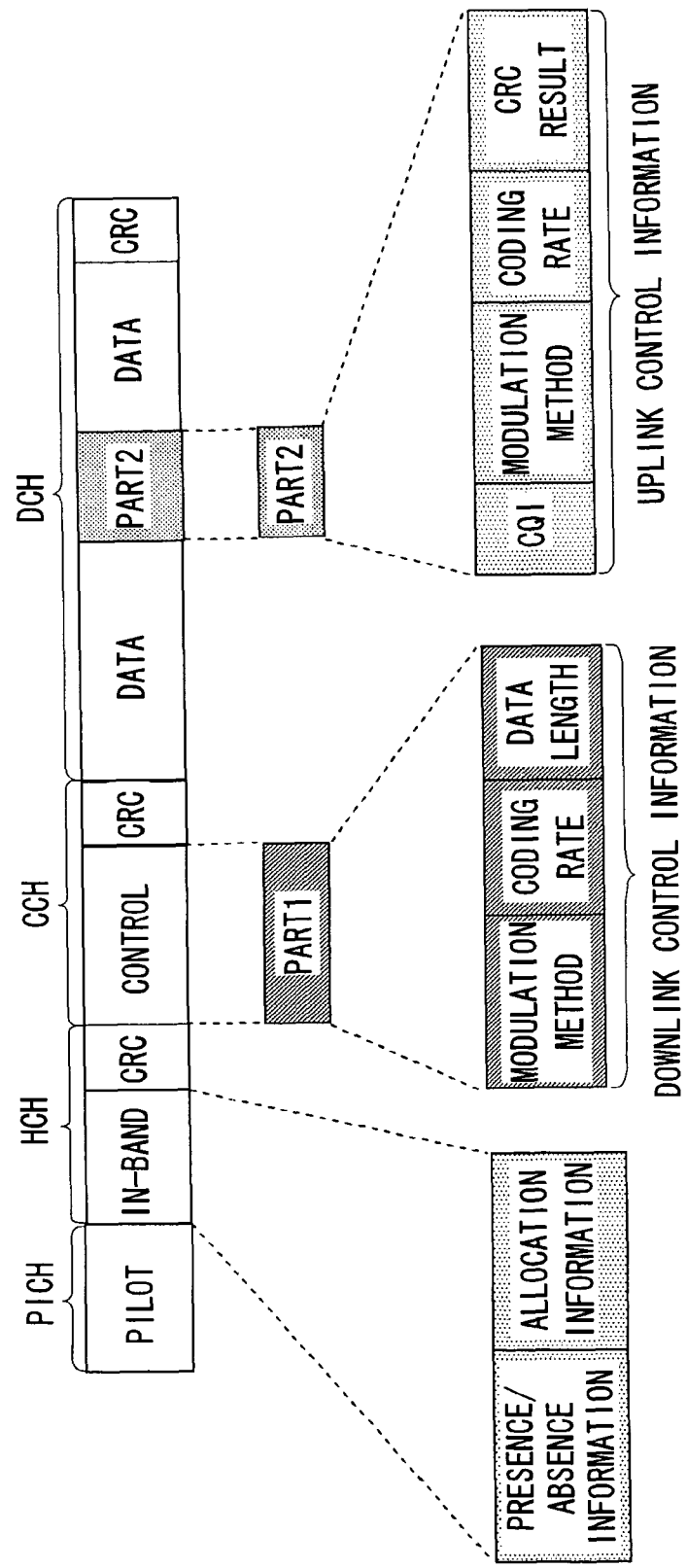
FIG. 10 is a diagram showing a frame format (a case of conducting the in-band) in the second embodiment.

The frame format used in the wireless communication system in the second embodiment will be described with reference to FIGS. 9 and 10. FIGS. 9 and 10 are diagrams each showing the frame format in the second embodiment, and illustrating the format of the frame (the downlink frame) transmitted from the base station 500 to the mobile station 501 or 502. The frame format in the second embodiment corresponds to the example shown in FIG. 2 discussed in the item of Outline of Embodiments of the Invention, and has a structure in which the control information part 2 is allocated to only the data channel (DCH). FIG. 9 shows the frame format in a case where the in-band is not conducted, and FIG. 10 shows the frame format in a case where the in-band is conducted.

The segmentation method of the control information in the second embodiment shall be the same as that in the first embodiment. Namely, the downlink control information is defined as the control information part 1 (PART 1), and the uplink control information is defined as the control information part 2 (PART 2). Further, the detailed information contained in the uplink control information and the detailed information contained in the downlink control information are the same as those in the first embodiment.

In the frame format in the second embodiment, a header channel (HCH) is attached. The header channel contains the in-band information and the CRC. The in-band information contains the presence/absence information showing whether the control information part 2 is allocated (in-band) in the data channel or not and the allocation information showing a location where the control information part 2 in the data channel is allocated. A piece of identifying information showing [presence] in the case of conducting the in-band is set in the presence/absence information field, and the identifying formation showing [absence] in the case of conducting none of the in-band is set in the presence/absence information field. A piece of information showing, in the case of conducting the in-band, an in-band location of the control information part 2 in the data channel, is set in the allocation information field. A CRC bit related to the data contained in the header channel is set in the CRC field.

In the frame format in the case of conducting none of the in-band shown in FIG. 9, both of the control information part 1 and the control information part 2 are allocated to the control channel, and only the user data is allocated to the data channel. On the other hand, in the frame format in the case of conducting the in-band shown in FIG. 10, the control information part 1 is allocated to the control channel, while the control information part 2 is allocated to the data channel. In this case, the user data and the control information part 2 are each allocated to the data channel.

Base Station

Figure 11:
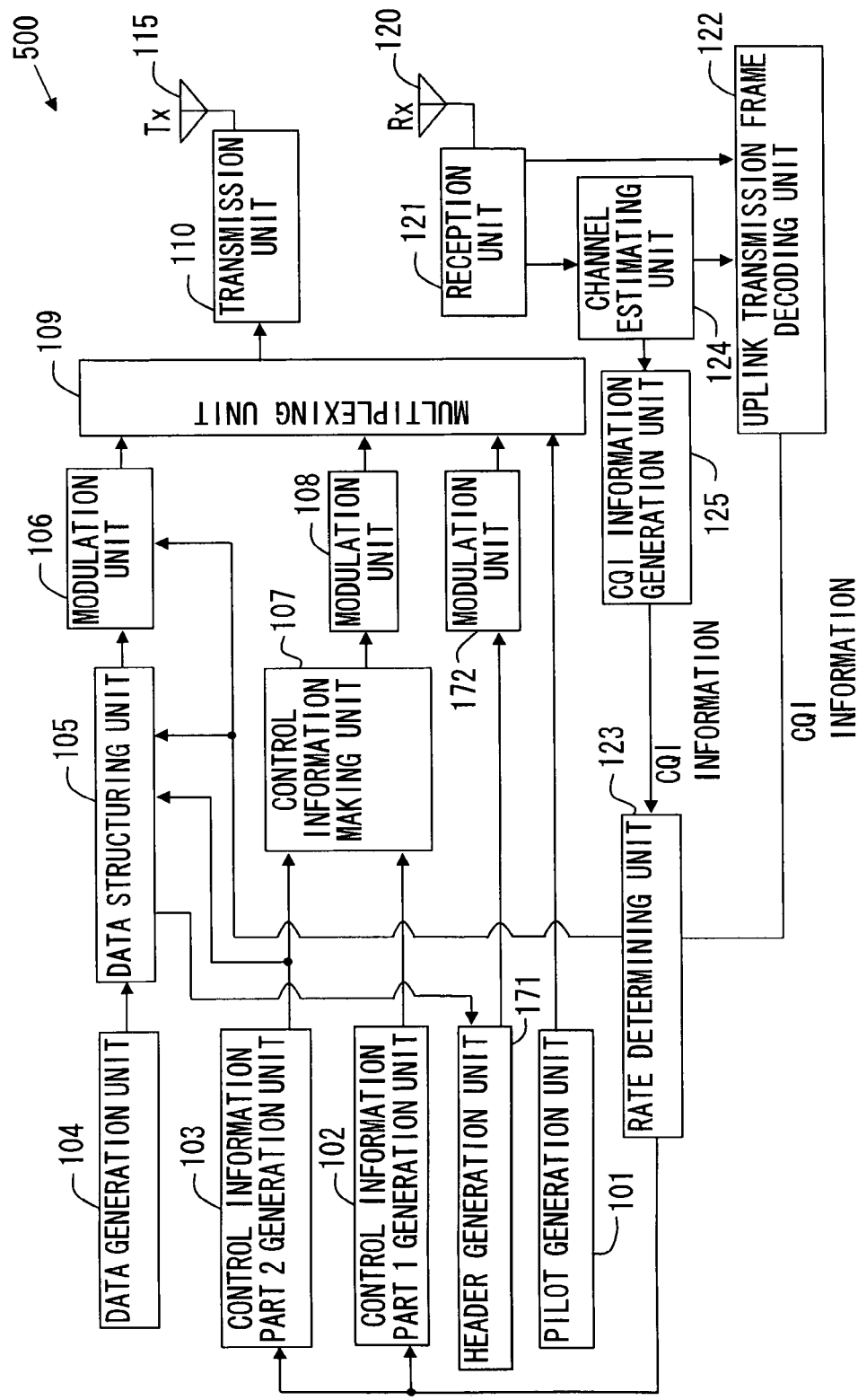
FIG. 11 is a diagram showing the device configuration of the base station in the second embodiment.

A device configuration of the base station 500 in the second embodiment will hereinafter be described with reference to FIG. 11. FIG. 11 is a block diagram showing the device configuration related to the transmitting functions of the base station 500 in the second embodiment. The base station 500 in the second embodiment includes, as the transmitting functions, in addition to the configuration in the first embodiment, a header generation unit 171 and a modulation unit 172. As the functional units other than these units, the functions related to the data structuring unit 105 and the multiplexing unit 109 are changed, and hence these units are exclusively explained, while the remaining functional units are the same as those in the first embodiment and are therefore omitted in their explanations.

The data structuring unit 105 generates the data that is allocated to the data channel in the frame format shown in FIG. 9 or 10. Here at, the data structuring unit 105 compares the coding rate of the data channel that is received from the rate determining unit 123 with the fixed-in-system coding rate of the control channel, and thus determines whether the control information part 2 received from the control information part 2 generation unit 103 is conducted the in-band or not. Specifically, the data structuring unit 105, if the coding rate of the data channel is lower than the coding rate of the control channel, allocates the control information part 2 to a predetermined location in the data channel but does not allocate the control information part 2 into the data channel in cases other than this. The data structuring unit 105, in the case of conducting the in-band of the control information part 2, notifies the header generation unit 171 of a purport that the in-band is conducted and of a location (an offset address etc) of the control information part 2.

The header generation unit 171 generates, based on the notification given from the data structuring unit 105, the in-band information data and the CRC data that are allocated to the header channel. The header generation unit 171, with respect to the in-band information data, sets the presence or absence of the in-band, of which the data structuring unit 105 has notified, in the presence/absence information field, and sets the similarly-notified location of the control information part 2 in the allocation information field, thereby generating the in-band information data. Then, the header generation unit 171 generates the CRC bit on the basis of the thus-generated in-band information data.

The header generation unit 171 encodes the thus-generated data by the predetermined coding rate. The coding rate and the coding method implemented by this header generation unit 171 involve using the fixed-in-system coding rate and coding method, wherein, for example, the convolutional coding method having the coding rate ⅓ is used. The coded data is subjected to the predetermined modulation process by the modulation unit 172 and is transferred to the multiplexing unit 109. The modulation method implemented by the modulation unit 172 also involves using the fixed-in-system method, wherein, for instance, the QPSK is used. Note that the coding rate, the coding method and the modulation method concerning the header channel involve employing the fixed-in-system methods and may also be retained adjustably in a table and so on. Moreover, the present invention does not limit the coding rate, the coding method and the modulation method related to the header channel.

The multiplexing unit 109 multiplexes each of the modulated pilot signal, control information signal, data signal and header signal, and transfers these multiplexed signals to the transmission unit 110. The multiplexed signals transferred to the transmission unit 110 undergo the processes such as the digital/analog conversion and the frequency conversion, and are transmitted from the transmitting antenna 115.

Mobile Station

Figure 12:
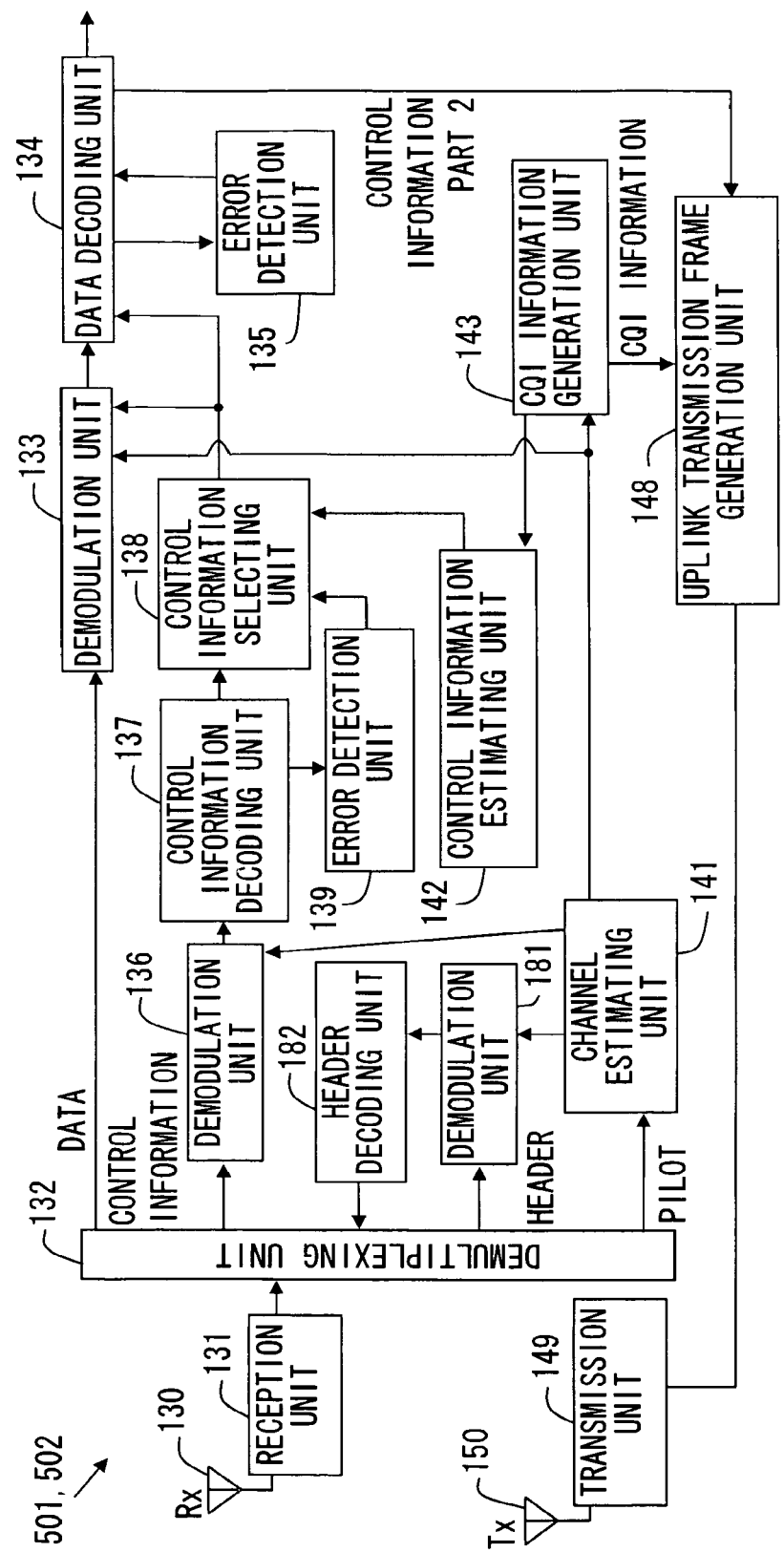
FIG. 12 is a diagram showing the device configuration of the mobile station in the second embodiment.

A device configuration of each of the mobile stations 501 and 502 in the second embodiment will hereinafter be described with reference to FIG. 12. FIG. 12 is a block diagram showing the device configuration related to the receiving functions of the mobile stations 501 and 502 in the second embodiment. Note that the mobile stations 501 and 502 are each the same device, and hence the following discussion shall deal with the mobile station 501. The mobile station 501 in the second embodiment includes, as the receiving functions, in addition to the configuration in the first embodiment, a demodulation unit 181 and a header decoding unit 182. As the functional units other than these units, the functions related to the demultiplexing unit 132, the control information selecting unit 138 and the data decoding unit 134 are changed, and hence these units are exclusively explained, while the remaining functional units are the same as those in the first embodiment and are therefore omitted in their explanations.

The demultiplexing unit 132, upon receiving the received signals from the reception unit 131, at first demultiplexes the header signal and the pilot signal therefrom. The demultiplexed pilot signal is transferred to the channel estimating unit 141. The header signal is transferred to the demodulation unit 181. The demultiplexing unit 132, when receiving the decoded data from the header decoding unit 182, refers to the in-band information in the received data, thereby judging the presence or absence of the in-band. To be specific, the demultiplexing unit 132, when the identifying information showing [presence] is set in the presence/absence information field in the in-band information, judges that the in-band is set, and further acquires the location information of the control information part 2 set in the allocation information field. Conversely, the demultiplexing unit 132, when the identifying information showing [absence] is set in the presence/absence information field in the in-band information, judges that the in-band is not conducting.

In the second embodiment, the sizes of the control channel and of the data channel change depending on the presence of the in-band (see FIGS. 9 and 10), and therefore the demultiplexing unit 132 demultiplexes the control channel and the data channel in accordance with a result of the judgment as to the presence of the in-band. The demultiplexed control information signal is transmitted together with the in-band information to the demodulation unit 133.

The demodulation unit 181 demodulates the header signal transferred from the demultiplexing unit 132 on the basis of the channel estimation value transferred from the channel estimating unit 141. Moreover, the demodulation unit 181 demodulates the header signal by the demodulation method corresponding to the modulation method (QPSK) implemented by the base station 500. This demodulation method involves utilizing the fixed-in-system method as the corresponding modulation method is retained as the fixed-in-system method in the base station 500. The demodulated header signal is transferred to the header decoding unit 182.

The header decoding unit 182 decodes the header signal transferred from the demodulation unit 181 by the decoding method corresponding to the coding rate (⅓) and the coding method (convolutional coding method) implemented by the base station 500 with respect to the header signal. This decoding method involves utilizing the fixed-in-system method as the corresponding coding rate and the corresponding coding method are retained as the fixed-in-system method in the base station 500. The decoded pieces of data, i.e., the in-band information and the CRC are sent to the demultiplexing unit 132.

The control information selecting unit 138 receiving the in-band information via the demodulation unit 136 and via the control information decoding unit 137 from the demultiplexing unit 132, selects the control information used for the demodulation of the data channel, corresponding to this in-band information and to a detection result sent from the error detection unit 139. The control information selecting unit 138, when the [presence] is set in the presence/absence information field in the in-band information and when the detection result shows no error, sends the modulation method in the control information part 1 transmitted from the control information decoding unit 137 to the demodulation unit 133, and sends the coding rate therein to the data decoding unit 134. The control information selecting unit 138, when the [absence] is set in the presence/absence information field in the in-band information and when the detection result shows no error (normal), acquires respectively the control information part 1 and the control information part 2 in the control information data sent from the control information decoding unit 137. The modulation method in the control information part 1 is sent to the demodulation unit 133, the coding rate therein is sent to the data decoding unit 134, and the control information part 2 is sent as it is to the data decoding unit 134. Further, when the [presence] is set in the presence/absence information field in the in-band information and when the detection result shows the error occurrence, the control information selecting unit 138 sends the control information part 1 estimated by the control information estimating unit 142 to the demodulation unit 133 and to the data decoding unit 134, respectively. When the [absence] is set in the presence/absence information field in the in-band information and when the detection result shows the error occurrence, the control information selecting unit 138 specifies a process of a request for the retransmission (unillustrated).

The data decoding unit 134 decodes the demodulated data on the basis of the coding rate and the coding method received from the control information selecting unit 138. The decoded data is transferred to the error detection unit 135. Further, the data decoding unit 134 extracts the control information part 2 from the decoded data on the basis of the in-band information transferred via the demodulation unit 133 from the demultiplexing unit 132. To be specific, the data decoding unit 134, if the identifying information showing the [presence] is set in the presence/absence information field in the in-band information, extracts the control information part 2 from the decoded data on the basis of the location (address) set in the same allocation information field. The data decoding unit 134, based on the error detection result of which the error detection unit 135 has notified, if this detection result shows no error (normal), outputs the decoded user data to other functional units (unillustrated), and sends the control information part 2 to the uplink transmission frame generation unit 148. Further, the data decoding unit 134, if the identifying information showing the [absence] is set in the presence/absence information field in the in-band information and if the error detection result of which the error detection unit 135 has notified shows no error (normal), outputs the decoded user data to other functional units (unillustrated), and sends the control information part 2 transmitted from the control information selecting unit 138 to the uplink transmission frame generation unit 148.

Operational Example

Operations of the base station 500 and the mobile stations 501, 502 in the second embodiment will hereinafter be described. To begin with, the transmitting operation of the base station 500 in the second embodiment will be explained with reference to FIG. 11.

The base station 500, when transmitting the data to the mobile station 501, transmits the data without conducting the in-band of the control information part 2. This is because the data structuring unit 105 determines not to allocate the control information part 2 to the data channel, since the coding rate of the data channel regarding the transmitted wireless frame that is determined by the rate determining unit 123 does not get lower than the fixed-in-system coding rate of the control channel. In this case, the information showing the [absence] is set in the presence/absence information field in the in-band information generated by the header generation unit 171.

On the other hand, the base station 500, on the occasion of transmitting the data to the mobile station 502, transmits the data conducted the in-band of the control information part 2. In this case, a CQI value of which the mobile station 502 notifies is very poor quality, and the coding rate of the data channel, which is determined by the rate determining unit 123, becomes lower than the fixed-in-system coding rate of the control channel. This being the case, the data structuring unit 105 allocates the control information part 2 to the data channel. In this case, the information showing the [presence] is set in the presence/absence information field in the in-band information generated by the header generation unit 171, and the location information of the control information part 2 in the data channel is set in the allocation information field.

Figure 13:
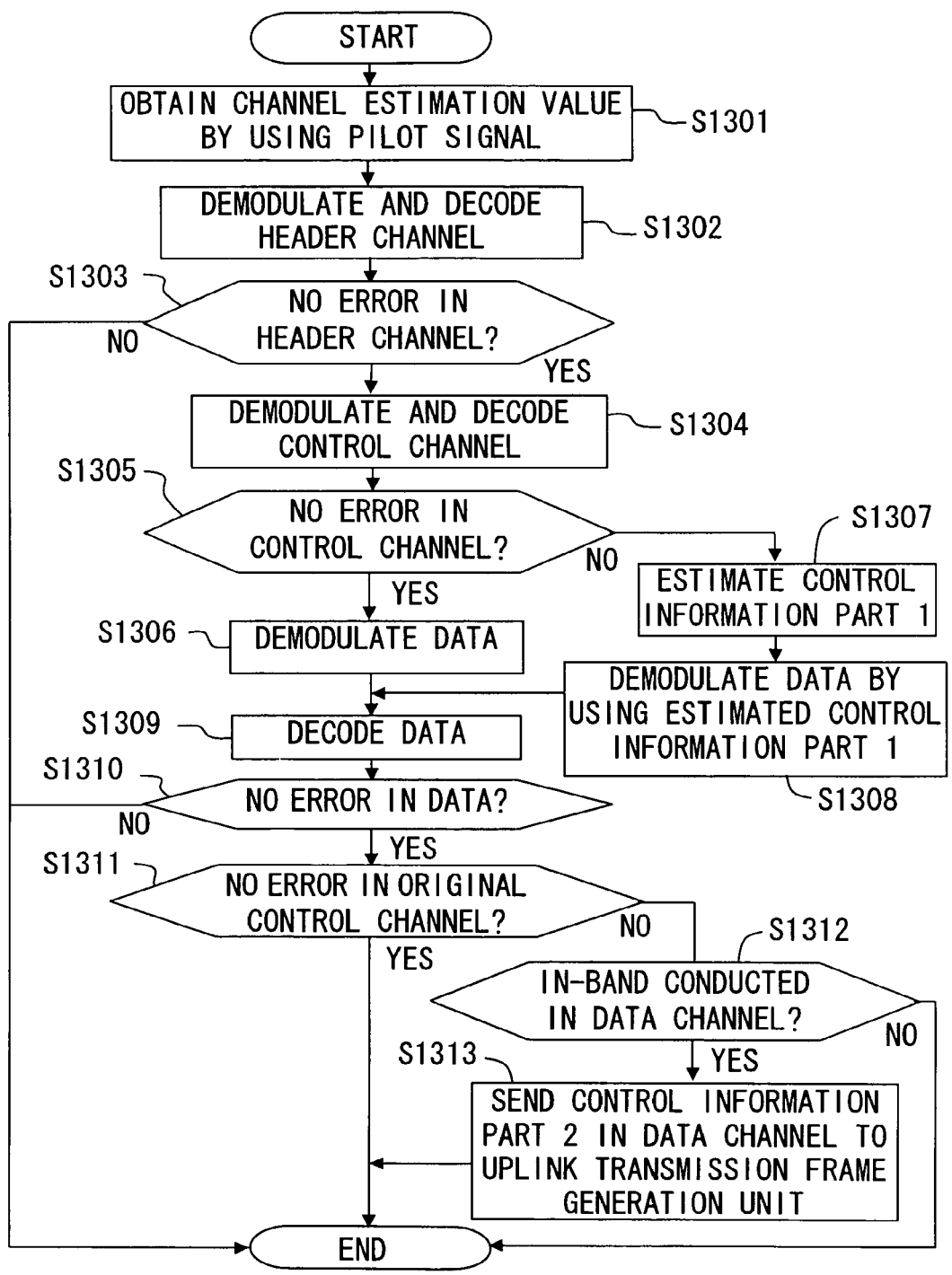
FIG. 13 is a diagram showing an example of the receiving operation of the mobile station in the second embodiment.

Next, a receiving operation of each of the mobile stations 501 and 502 in the second embodiment will be explained with reference to FIGS. 12 and 13. FIG. 13 is a flowchart showing an example of the receiving operation of each of the mobile stations 501 and 502 in the second embodiment.

The demultiplexing unit 132, upon receiving the received signals from the reception unit 131, demultiplexes the pilot signal and the header signal from these received signals. The channel estimating unit 141 estimates the channel between the base station and the mobile station from the thus-demultiplexed pilot signal (S1301). The thus-estimated channel estimation value is sent to the demodulation unit 181 related to the header signal, and the header signal is demodulated based on the channel estimation value by the demodulation unit 181. Further, the demodulation unit 181 demodulates the header signal by the demodulation method corresponding to the modulation method (QPSK) implemented by the base station 500 (S1302). Still further, the header decoding unit 182 decodes the thus-demodulated header data by the decoding method corresponding to the coding rate (⅓) and the coding method (convolutional coding) implemented by the base station 500 (S1302).

The demultiplexing unit 132 checks the decoded CRC allocated to the header channel and thus judges whether the error occurs in the header channel or not. Herein, if the error exists in the header channel (S1303; NO), the processing is terminated. Whereas if no error exists in the header channel (S1303; YES), the demultiplexing unit 132 grasps, based on the in-band information transferred from the header decoding unit 182, whether the in-band of the control information part 2 is conducted or not, and demultiplexes the control signal and the data signal from the receiving signals.

The demodulation unit 136 demodulates the demultiplexed control signal on the basis of the channel estimation value. Further, the demodulation unit 136 demodulates the control information signal by the demodulation method corresponding to the modulation method (QPSK) implemented by the base station 500 (S1304). Still further, the control information decoding unit 137 decodes the demodulated control information data by the decoding method corresponding to the coding rate (⅓) and the coding method (convolutional coding) implemented by the base station 500 (S1304).

The decoded control information data is sent to the error detection unit 139 and is CRC-checked by the error detection unit 139. As a result, if judged to have no error (S1305; YES), the control information selecting unit 138 transfers the control information part 1 contained in the control information data to the demodulation unit 133 and to the data decoding unit 134. The demodulation unit 133 demodulates the data signal given from the demultiplexing unit 132 on the basis of the channel estimation value given from the channel estimating unit 141, and further demodulates the data signal by the demodulation method corresponding to the modulation method contained in the control information part 1 received from the control information selecting unit 138 (S1306). Note that at this time, the control information selecting unit 138, if the control information part 2 is allocated in the control channel, extracts and transfers this control information part 2 to the data decoding unit 134.

Whereas if the error detection unit 139 judges that the error exists (S1305; NO), the control information estimating unit 142 estimates the modulation method and the coding rate from the CQI (SINR) given from the CQI information generation unit 143 (S1307). The estimating method by this control information estimating unit 142 is the same as the determination method of determining the modulation method and the coding rate by the rate determination unit 123 in the base station 500. This estimated modulation method is sent to the demodulation unit 133, and the estimated coding rate is sent to the data decoding unit 134. With this operation, if the error occurs in the control channel, the demodulation unit 133 demodulates the data by the modulation method estimated by the control information estimating unit 142 (S1308).

The data decoding unit 134, if the error occurs in the control channel, executes the predetermined decoding corresponding to the coding rate estimated by the control information estimating unit 142, and, whereas if the error does not occur in the control channel, executes the predetermined decoding corresponding to the coding rate set in the control information part 1 of the control channel (S1309). The error detection unit 135 checks the decoded CRC, thereby checking whether or not the error occurs in the data allocated to the data channel. Then, if judged to have the error (S1310; NO), the retransmission request is made.

The data decoding unit 134, if judged to have no error from the information showing whether or not the error occurs in the control channel of which the control information selecting unit 138 has notified (S1311; YES), sends the control information part 2 in the control channel to the uplink transmission frame generation unit 148. Whereas if judged to have the error (S1311; NO) and if the in-band is conducted (S1312; YES), the data decoding unit 134 sends the control information part 2 allocated (in-band) to the data channel of the uplink transmission frame generation unit 148 (S1313). Note that if judged to have the error in the control channel (S1311; NO) and if the in-band is not conducted (S1312; NO), the retransmission request is made.

Operation and Effect in Embodiment

In the wireless communication system in the second embodiment, the case of conducting the in-band involves employing the frame format in which the control information part 2 is allocated to only the data channel. Corresponding to this frame format, in the frame in the second embodiment, the header channel containing the in-band information is attached. This is because the size of the control channel in this frame format is variable depending on the case of conducting the in-band and the case of conducting none of the in-band.

With this operation, the mobile station receiving the frame can judge the presence or absence of the in-band simply by referring to the in-band information in this header channel. Further, the attached in-band information after all contains nothing but the presence/absence information and the allocation information, and therefore the overhead of the transmission frame does not extremely increase.

Further, when transmitting to the mobile station in the channel status that is as bad as requiring the in-band, the uplink control information is allocated to the data channel, and hence the size of the control channel can be reduced. This, according to the second embodiment, enables the overhead of the transmission frame to be reduced.

What is claimed is:

1. A wireless communication device performing communications by using a radio frame containing control information transmitted by a control channel and data transmitted by a data channel, the wireless communication device comprising:
 a structuring unit that allocates a first part of the control information and a second part of the control information, which denotes different control information from the first part, to the control channel, allocates the second part of the control information to the data channel so as to be inserted between the data transmitted by the data channel, and allocates, to the data channel, in-band information which indicates whether the second part of the control information is allocated to the data channel and a location where the second part of the control information in the data channel is allocated; and
 a transmission unit that transmits the radio frame including the data including the second part of the control information and the in-band information and the location, and the control information.

2. The wireless communication device according to claim 1, wherein the first part of the control information denotes control information relating to a result of error detection for a received signal, and the second part of the control information denotes a channel quality indicator.

3. A method for a wireless communication device performing communications by using a radio frame containing control information transmitted by a control channel and data transmitted by a data channel, the method comprising:
 allocating, by a control information making unit, a first part of the control information and a second part of the control information, which denotes different control information from the first part, to the control channel;
 allocating, by a data structuring unit, the second part of the control information to the data channel so as to be inserted between the data transmitted by the data channel, and allocating, to the data channel, in-band information which indicates whether the second part of the control information is allocated to the data channel and a location where the second part of the control information in the data channel is allocated; and
 transmitting the radio frame including the data including the second part of the control information and the in-band information and the location, and the control information.

* * * * *